(12) United States Patent
Hashimoto et al.

(10) Patent No.: US 9,781,374 B2
(45) Date of Patent: Oct. 3, 2017

(54) PHOTOELECTRIC CONVERSION APPARATUS, PHOTOELECTRIC CONVERSION SYSTEM, AND DRIVING METHOD FOR THE PHOTOELECTRIC CONVERSION APPARATUS

(71) Applicant: CANON KABUSHIKI KAISHA, Tokyo (JP)

(72) Inventors: Seiji Hashimoto, Yokohama (JP); Hidekazu Takahashi, Zama (JP); Atsushi Furubayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/814,058

(22) Filed: Jul. 30, 2015

(65) Prior Publication Data

US 2016/0037113 A1    Feb. 4, 2016

(30) Foreign Application Priority Data

Jul. 31, 2014 (JP) .................................. 2014-156784

(51) Int. Cl.
*H04N 5/378*    (2011.01)
*H04N 5/374*    (2011.01)
*H04N 5/3745*    (2011.01)

(52) U.S. Cl.
CPC ......... *H04N 5/378* (2013.01); *H04N 5/37452* (2013.01)

(58) Field of Classification Search
CPC ........ H04N 5/378; H04N 5/335; H04N 5/359; H04N 5/3559; H04N 5/3696; H04N 5/37452; H04N 5/3745
See application file for complete search history.

(56) References Cited

U.S. PATENT DOCUMENTS

| | | | | |
|---|---|---|---|---|
| 6,075,256 A | * | 6/2000 | Kaifu | H04N 5/378 250/370.09 |
| 2008/0035965 A1 | * | 2/2008 | Hayashi | H01L 27/14647 257/291 |
| 2008/0211954 A1 | * | 9/2008 | Ota | H04N 5/374 348/311 |
| 2010/0187501 A1 | * | 7/2010 | Toda | B82Y 20/00 257/21 |
| 2010/0194936 A1 | * | 8/2010 | Kanbe | H04N 5/2353 348/243 |
| 2011/0049661 A1 | * | 3/2011 | Maehara | H01L 27/307 257/432 |
| 2011/0216212 A1 | * | 9/2011 | Watanabe | H04N 5/228 348/222.1 |
| 2012/0002089 A1 | * | 1/2012 | Wang | H04N 5/35572 348/297 |
| 2012/0318959 A1 | * | 12/2012 | Yamaguchi | H04N 5/369 250/208.1 |
| 2013/0100330 A1 | * | 4/2013 | Yamada | H04N 5/32 348/333.01 |

(Continued)

*Primary Examiner* — Jason Flohre
(74) *Attorney, Agent, or Firm* — Canon USA, Inc., IP Division

(57) ABSTRACT

An output control unit configured to set an amplitude of a signal output to a signal line to be smaller as compared with a case where an amplification unit outputs a signal on the basis of a potential of the input node or put the amplification unit into a non-operating state is provided.

20 Claims, 11 Drawing Sheets

(56) References Cited

U.S. PATENT DOCUMENTS

| | | | | |
|---|---|---|---|---|
| 2013/0120624 | A1* | 5/2013 | Okita | H04N 5/335 |
| | | | | 348/300 |
| 2014/0145068 | A1* | 5/2014 | Meynants | H04N 5/2254 |
| | | | | 250/208.1 |
| 2014/0353472 | A1* | 12/2014 | Dierickx | H04N 5/3559 |
| | | | | 250/214 P |
| 2015/0009379 | A1* | 1/2015 | Yan | H04N 5/3559 |
| | | | | 348/302 |
| 2015/0077611 | A1* | 3/2015 | Yamashita | H04N 5/3559 |
| | | | | 348/308 |
| 2015/0146061 | A1* | 5/2015 | Ishii | H04N 5/3698 |
| | | | | 348/301 |

* cited by examiner

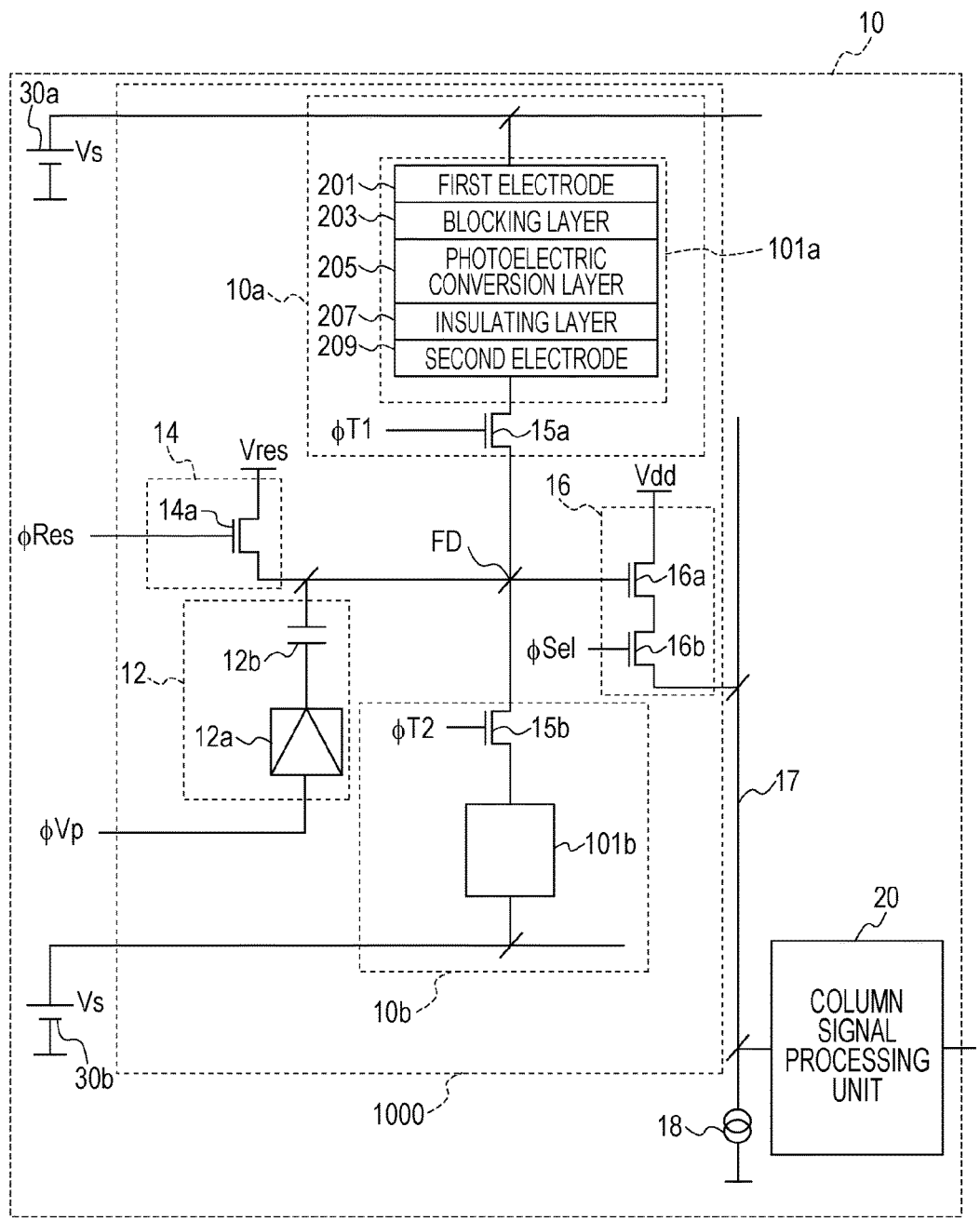

PHOTOELECTRIC CONVERSION APPARATUS, PHOTOELECTRIC CONVERSION SYSTEM, AND DRIVING METHOD FOR THE PHOTOELECTRIC CONVERSION APPARATUS

BACKGROUND OF THE INVENTION

Field of the Invention

The present invention relates to a photoelectric conversion apparatus, a photoelectric conversion system, and a driving method for the photoelectric conversion apparatus.

Description of the Related Art

A pixel of a photoelectric conversion apparatus disclosed in Japanese Patent Laid-Open No. 2013-131900 includes a so-called MIS-type photoelectric conversion unit constituted by a metal, an insulating film, and a semiconductor. The photoelectric conversion unit accumulates signal carriers. The pixel further includes an amplification transistor configured to output a signal based on the signal carriers accumulated by the photoelectric conversion unit.

The MIS-type photoelectric conversion unit disclosed in Japanese Patent Laid-Open No. 8-116044 includes a first electrode, a second electrode provided on a substrate side with respect to the first electrode, and a photoelectric conversion layer arranged between the first electrode and the second electrode. Japanese Patent Laid-Open No. 8-116044 discloses that, after a magnitude relationship between potentials of the first electrode and the second electrode is set to be reversed from that at the time of the accumulation of the signal carriers to discharge the accumulated signal carriers from the photoelectric conversion layer, the magnitude relationship is returned to be the same as that at the time of the accumulation of the signal carriers again.

SUMMARY OF THE INVENTION

According to an aspect of the present invention, there is provided a photoelectric conversion apparatus including: a photoelectric conversion unit; an amplification unit; a signal line; and an output control unit, in which the photoelectric conversion unit includes a first electrode, a second electrode, a photoelectric conversion layer that is arranged between the first electrode and the second electrode and accumulates signal carriers, and an insulating layer arranged between the photoelectric conversion layer and the second electrode, an optical signal based on the accumulated signal carriers is output to an input node of the amplification unit, an output node of the amplification unit is connected to the signal line, a magnitude relationship between a potential applied to the first electrode and a potential applied to the second electrode is a first relationship in a first period during which the photoelectric conversion layer accumulates the signal carriers, and the magnitude relationship is a second relationship that is opposite to the first relationship in a second period during which the signal carriers are discharged from the photoelectric conversion layer while the second electrode is applied with a potential having a different value from the potential applied in the first period, and the output control unit restricts a potential range of the signal line to be within a predetermined range narrower than a potential range of an output of the amplification unit in at least a part of the second period, or the output control unit puts the amplification unit into a non-operating state in at least a part of the second period.

In addition, according to another aspect of the present invention, there is provided a driving method for a photoelectric conversion apparatus including a photoelectric conversion unit, an amplification unit, a signal line, the photoelectric conversion unit including a first electrode, a second electrode, a photoelectric conversion layer that is arranged between the first electrode and the second electrode and accumulates signal carriers, and an insulating layer arranged between the photoelectric conversion layer and the second electrode, the driving method including: setting a magnitude relationship between a potential applied to the first electrode and a potential applied to the second electrode to be a first relationship in a first period during which the photoelectric conversion layer accumulates the signal carriers; setting the magnitude relationship to be a second relationship that is opposite to the first relationship in a second period during which the signal carriers are discharged from the photoelectric conversion layer while the second electrode is applied with a potential having a different value from the potential applied in the first period; and restricting a potential range of the signal line to be within a predetermined range narrower than a potential range of an output of the amplification unit in at least a part of the second period or putting the amplification unit into a non-operating state in at least a part of the second period.

Further features of the present invention will become apparent from the following description of exemplary embodiments with reference to the attached drawings.

BRIEF DESCRIPTION OF THE DRAWINGS

FIG. 6 illustrates an example of the photoelectric conversion apparatus.

DESCRIPTION OF THE EMBODIMENTS

In a case where accumulated signal carriers are discharged from an MIS photoelectric conversion layer, a potential supplied to a second electrode is changed from a first potential to a second potential. According to this, a potential of an input node of an amplification transistor electrically connected to the second electrode is also changed from the first potential to the second potential. Therefore, a signal level of a signal output by the amplification transistor is changed. Thereafter, a potential supplied to the second electrode is changed from the second potential to the first potential. According to this, the potential of the input node of the amplification transistor turns to a potential based on an optical signal from the second potential. In a case where a signal level of the optical signal is small, it takes time until the signal output by the amplification transistor settles down from the signal level output when the potential of the input node is the second potential to the signal level based on the optical signal. Therefore, a situation may occur that this time spent until the signal output by the amplification transistor settles down to the signal level based on the optical signal hinders speeding-up of a photoelectric conversion apparatus.

In addition, before the signal output by the amplification transistor settles down from the signal level output when the potential of the input node is the second potential to the signal level based on the optical signal, a circuit in a following stage of the amplification transistor may hold the signal output by the amplification transistor in some cases. In this case, a situation occurs that an accuracy of the signal held by the circuit in the following stage of the amplification transistor is decreased.

Hereinafter, photoelectric conversion apparatuses according to the respective exemplary embodiments will be described with reference to the drawings.

First Exemplary Embodiment

Figure 1A:
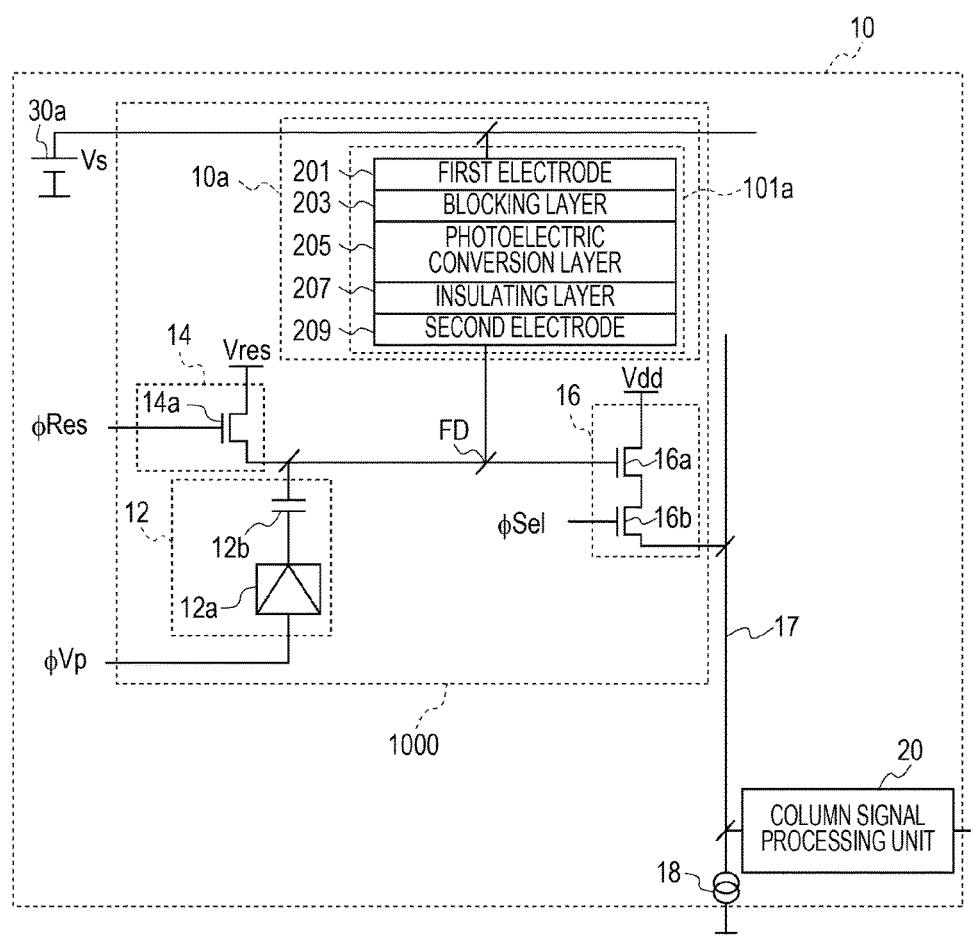
FIG. 1A illustrates an example configuration of a photoelectric conversion apparatus.

A photoelectric conversion apparatus 10 illustrated in FIG. 1A includes a pixel cell 1000, a capacitance driving unit 12, a vertical signal line 17, a current source 18, and a column signal processing unit 20. The photoelectric conversion apparatus 10 also includes a power source unit 30a.

The pixel cell 1000 includes a unit pixel 10a, a reset unit 14, and a pixel output unit 16.

FIG. 1A illustrates the single pixel cell 1000, which corresponds to one of a plurality of pixel cells 1000 arranged across a plurality of rows and a plurality of columns. FIG. 1A also illustrates one each of the vertical signal lines 17, the current sources 18, and the column signal processing units 20. These respectively correspond to one of the vertical signal lines 17 on the plurality of columns, the current sources 18 on the plurality of columns, and the column signal processing units 20 on the plurality of columns which are provided while corresponding to the respective columns where the plurality of pixel cells 1000 are arranged.

The unit pixel 10a includes a photoelectric conversion unit 101a. The photoelectric conversion unit 101a includes a first electrode 201, a blocking layer 203, a photoelectric conversion layer 205, an insulating layer 207, and a second electrode 209. The blocking layer 203 is provided between the first electrode 201 and the photoelectric conversion layer 205, and the photoelectric conversion layer 205 is provided between the blocking layer 203 and the insulating layer 207. The insulating layer 207 is provided between the photoelectric conversion layer 205 and the second electrode 209.

The first electrode 201 is constituted by a conductive member having a high transmittance with respect to light in a wavelength band in which the photoelectric conversion layer 205 has sensitivity. For example, a compound containing indium and/or tin such as indium tin oxide (ITO) or a compound such as ZnO is used as a material of the first electrode 201. According to this, the photoelectric conversion layer 205 according to the present exemplary embodiment can obtain more light than a case where an opaque electrode such as copper is used as the first electrode 201. As another example, the first electrode 201 according to the present exemplary embodiment may be formed of polysilicon or metal having a thickness to an extent that a predetermined amount of light transmits.

The blocking layer 203 suppresses injection into the photoelectric conversion layer 205 of electric carriers having a same conductive type as signal carriers accumulated by the photoelectric conversion layer 205 from the first electrode 201 to the photoelectric conversion layer 205. The photoelectric conversion layer 205 is depleted by a potential difference between a potential Vs applied to the first electrode 201 and a potential of the second electrode 209. A gradient of the potential of the photoelectric conversion layer 205 is inverted in accordance with a relationship between the potential Vs applied to the first electrode 201 and the potential of the second electrode 209. With the above-described configuration, the photoelectric conversion layer 205 can perform the accumulation of the signal carriers and discharge of the accumulated signal carriers. An operation by the photoelectric conversion unit 101a will be described below.

It is noted that, according to the present exemplary embodiment, a power source voltage supplied to the first electrode 201 is the potential Vs supplied from the power source unit 30a.

The photoelectric conversion layer 205 is formed of intrinsic amorphous silicon (hereinafter, will be referred to as a-Si), low concentration P-type a-Si, low concentration N-type a-Si, or the like. Alternatively, the photoelectric conversion layer 205 may be formed of a compound semiconductor. For example, the compound semiconductor includes a group III-V compound semiconductor such as BN, GaAs, GaP, AlSb, or GaAlAsP, a group II-VI compound semiconductor such as CdSe, ZnS, or HdTe, or a group IV-VI compound semiconductor such as PbS, PbTe, or CuO. Alternatively, the photoelectric conversion layer 205 may be formed of an organic material. For example, fullerene, coumarin 6 (C6), rhodamine 6G (R6G), zinc phthalocyanine (ZnPc), quinacridone, phthalocyanine compounds, naphthalocyanine compounds, or the like can be used. Furthermore, a quantum dot film constituted by including the above-described compound semiconductor can be used can be used as the photoelectric conversion layer 205.

In a case where the photoelectric conversion layer 205 is constituted by a semiconductor, an impurity concentration of this semiconductor may be low, or this semiconductor may be intrinsic. According to the above-described configuration, since the depletion layer can be sufficiently extended in the photoelectric conversion layer 205, it is possible to attain advantages such as the increase in the sensitivity and the noise reduction.

An N-type or P-type semiconductor using the same material as the semiconductor used for the photoelectric conversion layer 205 and also having a higher impurity concentration than the semiconductor used for the photoelectric conversion layer 205 can be used for the blocking layer 203. For example, in a case where a-Si is used for the photoelectric conversion layer 205, an N-type a-Si into which impurity is doped or a P-type a-Si into which impurity is doped is used for the blocking layer 203. Since a position of a Fermi level varies depending on a difference of the impurity concentration, the blocking layer 203 functions as a potential barrier with respect to only one of the electron and the hole. In a case where the photoelectric conversion layer 205 includes the quantum dot film, using the same material as the semiconductor used for the quantum dot film and also having the blocking layer 203 of a conductivity type opposite to that of the quantum dot film may be provided. For example, in a case where the quantum dot film is P-type PbS, the blocking layer 203 may be N-type PbS. Even in the case of the blocking layer 203 using the same material as the quantum dot film and having the same conductivity type, it is sufficient when the impurity concentration of the quantum dot film is set to be different from that of the blocking layer 203.

Alternatively, the blocking layer 203 can be constituted by a material different from that of the photoelectric conversion layer 205. According to the above-described configuration, a hetero junction is formed. Since a bandgap varies depending on a difference of the materials, the potential barrier can be formed with respect to only one of the electron and the hole. In a case where the photoelectric conversion layer 205 contains the quantum dot film, for example, PbS may be used for the quantum dot film, and ZnO may be used for the blocking layer 203.

The insulating layer 207 is arranged between the photoelectric conversion layer 205 and the second electrode 209. For example, amorphous silicon oxide (hereinafter, will be referred to as a-SiO), amorphous silicon nitride (a-SiN), or an organic material is used as a material of the insulating layer 207. A thickness of the insulating layer 207 may be set as a thickness to an extent that signal carriers do not transmit by a tunnel effect. With the above-described configuration, the leak current can be reduced, and the noise can be reduced. Specifically, it is sufficient when the thickness of the insulating layer 207 may be 50 nm or higher.

In a case where the amorphous film is used as the blocking layer 203, the photoelectric conversion layer 205, and the insulating layer 207, hydrogenation processing may be performed, and a dangling bond may be terminated by hydrogen. With the above-described configuration, it is possible to reduce the noise.

The second electrode 209 is constituted by a conductive member such as metal. A same material as a conductive material constituting a conductive line or a conductive material constituting a pad electrode for a connection to an external part is used for the second electrode 209. According to the above-described configuration, the photoelectric conversion unit 101a according to the present exemplary embodiment can be formed at the same time as the second electrode 209 and the conductive material constituting the conductive line or the pad electrode. Therefore, the photoelectric conversion unit 101a according to the present exemplary embodiment can be manufactured in a more simplified manufacturing process as compared with a case where the second electrode 209 is formed of a material different from that of the conductive material constituting the conductive line or the pad electrode.

The first electrode 201 of the photoelectric conversion unit 101a is electrically connected to the power source unit 30a. The power source unit 30a supplies the potential Vs to the first electrode 201. The reset unit 14 includes a reset transistor 14a. In the reset transistor 14a, one of a source and a drain is supplied with a reset voltage Vres, and the other one of the source and the drain is electrically connected to a node FD. The reset voltage Vres is a potential lower than the potential Vs. According to the present exemplary embodiment, the potential Vs is set as 5 V, and the reset voltage Vres is set as 2 V. A signal ϕRes is input to a gate of the reset transistor 14a from a vertical scanning circuit that is not illustrated in the drawing.

The capacitance driving unit 12 includes a buffer circuit 12a and a capacitance element 12b. A first node corresponding to one node of the capacitance element 12b is electrically connected to the node FD corresponding to a third node. Furthermore, the first node of the capacitance element 12b is electrically connected to the second electrode 209 of the photoelectric conversion unit 101a. A second node corresponding to the other node of the capacitance element 12b is electrically connected to the buffer circuit 12a. A signal ϕVp is input to the buffer circuit 12a from a timing generator that is not illustrated in the drawing. The buffer circuit 12a supplies a potential obtained by buffering a potential of the signal ϕVp to the capacitance element 12b. The timing generator is a capacitance potential supply unit configured to supply the signal ϕVp having a different potential to the capacitance element 12b via the buffer circuit 12a.

The capacitance element 12b is electrically connected to the node FD. The capacitance element 12b includes, for example, two electrodes facing each other. The two electrodes are formed of a material such as polysilicon or a metal. Alternatively, the capacitance element 12b is constituted by including a semiconductor region and a gate electrode arranged on the semiconductor region.

According to the configuration in which the capacitance element 12b is connected to the node FD, it is possible to reduce the noise when an optical signal is read out from the photoelectric conversion unit 101a. This noise reduction effect will be described.

The photoelectric conversion apparatus according to the present exemplary embodiment controls the potential of the node FD. The potential of the second electrode 209 of the photoelectric conversion unit 101a changes in accordance with a ratio of the capacitance element 12b to a combined capacitance of a gate capacitance of an amplification transistor 16a connected by the node FD and a capacitance value of a capacitance component between the first electrode 201 and the second electrode 209 (hereinafter, will be referred to as capacitance value of the photoelectric conversion unit 101a). This is because the capacitance element 12b and the combined capacitance can be regarded as two capacitance connected in series.

In the photoelectric conversion apparatus according to the present exemplary embodiment, as the capacitance value of the capacitance element 12b is higher, the changing quantity of the potential of the second electrode 209 when the signal ϕVp is changed becomes higher.

According to the present exemplary embodiment, the capacitance element 12b is electrically connected to the node FD. A node of the capacitance element 12b to which the potential of the signal ϕVp is input is electrically separated from the node FD.

In the photoelectric conversion apparatus according to the present exemplary embodiment, as the capacitance value of the node FD is higher, the changing quantity of the potential of the second electrode 209 when the potential of the node FD is changed becomes higher.

According to the present exemplary embodiment, the capacitance element 12b is electrically connected to the node FD. Therefore, when the potential of the second electrode 209 is controlled to read out the optical signal from the photoelectric conversion unit 101a, it is possible to apply a large potential difference between the first electrode 201 and the second electrode 209. According to this, since the photoelectric conversion apparatus according to the present exemplary embodiment can easily deplete the photoelectric conversion layer 205, it is possible to reduce the noise included in the optical signal.

The pixel output unit 16 includes the amplification transistor 16a and a selection transistor 16b. A gate corresponding to an input node of the amplification transistor 16a is electrically connected to the node FD. A potential Vdd is input to one of a source and a drain of the amplification transistor 16a, and the other one of the source and the drain is electrically connected to one of a source and a drain of the selection transistor 16b. The other one of the source and the drain of the selection transistor 16b are electrically connected to the vertical signal line 17. A signal φSel is input to a gate of the selection transistor 16b from the vertical scanning circuit that is not illustrated. The amplification transistor 16a corresponding to an amplification unit outputs a signal obtained by amplifying the signal output from the second electrode 209. A node connected to the vertical signal line 17 of the selection transistor 16b is an output node of the amplification unit.

The current source 18 is electrically connected to the selection transistor 16b via the vertical signal line 17. When the selection transistor 16b is turned on, the amplification transistor 16a and the current source 18 constitute a source follower circuit.

The signal output from the amplification transistor 16a via the selection transistor 16b to the vertical signal line 17 is input to the column signal processing unit 20. The column signal processing unit 20 outputs a signal based on the signal output from the amplification transistor 16a to the vertical signal line 17.

Figure 1B:
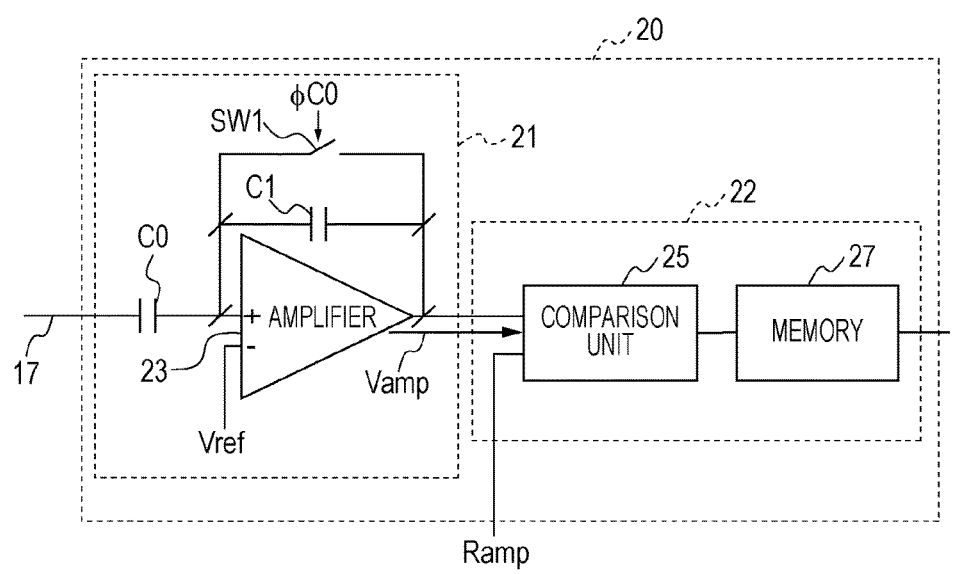
FIG. 1B illustrates an example configuration of a column signal processing unit.

FIG. 1B illustrates a configuration of the column signal processing unit 20.

The column signal processing unit 20 includes a column amplification unit 21 and an analog-to-digital (AD) conversion unit 22. The column amplification unit 21 includes a capacitance element C0, a capacitance element C1, a switch SW1, and an amplifier 23. An operation by the switch SW1 is controlled by a signal φC0 output from the timing generator that is not illustrated. A signal output from the amplification transistor 16a via the capacitance element C0 to the vertical signal line 17 is input to an inverting input node of the amplifier 23. A reference voltage Vref is input to a non-inverting input node of the amplifier 23. A signal Vamp output from the amplifier 23 is a signal obtained by inverting and amplifying the signal input to the inverting input node of the amplifier 23. An amplification factor of the amplifier 23 is k that is a negative value.

The AD conversion unit 22 includes a comparison unit 25 and a memory 27. The signal Vamp is input from the amplifier 23 to the comparison unit 25. The comparison unit 25 compares a potential of a ramp signal Ramp input from an external part of the column signal processing unit 20 with a potential of the signal Vamp. The ramp signal Ramp is a signal in which a potential monotonically changes depending on time. The signal output from the comparison unit 25 to the memory 27 is a signal indicating a result of a comparison between the potential of the ramp signal Ramp and the potential of the signal Vamp. The memory 27 holds a signal with which time from a timing when the ramp signal Ramp starts the change of the potential until the signal level of the comparison result signal changes is counted. This signal held by the memory 27 is a digital signal based on the signal Vamp.

The digital signal held by the memory 27 in each of the column signal processing units 20 on the plurality of columns is output sequentially for each column to an external part of the photoelectric conversion apparatus by a horizontal scanning circuit that is not illustrated in the drawing.

Next, an operation by the photoelectric conversion unit 101a according to the present exemplary embodiment will be described. Each of FIGS. 2A to 2D schematically illustrates energy bands in the photoelectric conversion unit 101a. Each of FIGS. 2A to 2D illustrates the energy bands of the first electrode 201, the blocking layer 203, the photoelectric conversion layer 205, the insulating layer 207, and the second electrode 209. A vertical axis of FIGS. 2A to 2D represents a potential with respect to an electron. The higher the vertical axis of FIGS. 2A to 2D, the higher the potential to the electron. Therefore, the lower the vertical axis of FIGS. 2A to 2D, the lower the potential to the electron. With regard to the first electrode 201 and the second electrode 209, a Fermi level is indicated. With regard to the blocking layer 203 and the photoelectric conversion layer 205, a band cap between an energy level of a conduction band and an energy level of a valence band are indicated.

As operations by the photoelectric conversion unit 101a, the following steps (1) to (5) are repeatedly performed: (1) Reset of the input node of the amplification unit, (2) read of a noise signal, (3) transfer of the signal carriers from photoelectric conversion unit, (4) read of the optical signal, and (5) accumulation of the signal carriers. Hereinafter, each of the steps will be described.

Figure 2A:
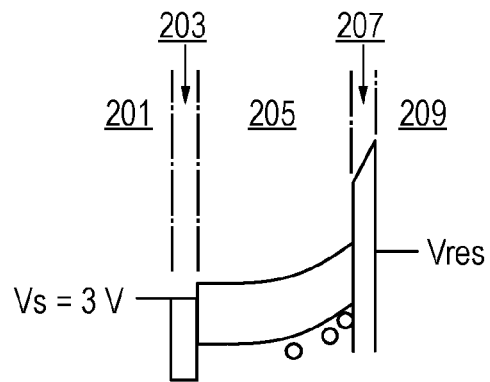
FIGS. 2A to 2D illustrate an example operation by a photoelectric conversion unit.

FIG. 2A illustrates a state of the photoelectric conversion unit 101a in step (1) to step (2). The first electrode 201 is supplied with the potential Vs. The first potential Vs is, for example, 3 V. Holes indicated by white circles are accumulated as signal carriers generated during an exposure period in the photoelectric conversion layer 205. A surface potential on the insulating layer 207 side of the photoelectric conversion layer 205 changes in accordance with an amount of accumulated holes. The buffer circuit 12a supplies a first potential Vd1 to the capacitance element 12b. The first potential Vd1 is, for example, 0 V.

The reset transistor 14a is turned on in this state. According to this, the potential of the node including the second electrode 209, that is, the node FD, is reset to the reset voltage Vres. The reset voltage Vres is, for example, 1 V. The node FD is connected to the gate corresponding to the input node of the amplification transistor 16a. For that reason, reset of the input node of the amplification unit is performed.

Thereafter, the reset transistor 14a is turned off. According to this, the node FD becomes electrically floating. At this time, reset noise by reset transistor 14a (noise kTC1 in FIGS. 2A to 2D) may be generated. At this time, the holes of the signal carriers remain to be accumulated in the photoelectric conversion layer 205.

When the selection transistor 16b is turned on, the amplification transistor 16a outputs the noise signal including the reset noise.

Figure 2B:
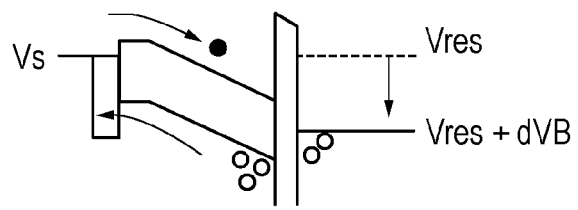
Figure 2C:
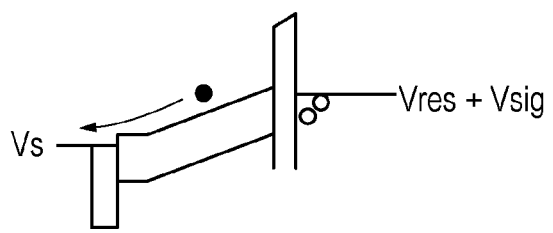

FIGS. 2B and 2C illustrate states of the photoelectric conversion unit 101a in step (3). First, the buffer circuit 12a supplies a second potential Vd2 to the capacitance element 12b. Since holes are used as the signal carriers, the second potential Vd2 is a potential higher than the first potential Vd1. The second potential Vd2 is, for example, 5 V.

At this time, the potential of the second electrode 209 (node FD) changes towards the same direction as the change of the potential supplied by the buffer circuit 12a. The changing quantity of the potential dVB of the second electrode 209 is determined in accordance with a ratio of a capacitance value C1 of the capacitance element 12b electrically connected to the node FD to a capacitance value C2 of the photoelectric conversion unit 101a. dVB is represented as follows.

$$dVB = (Vd2-Vd1) \times C1/(C1+C2) \quad (1)$$

In the following explanation, the capacitance value C1 and the capacitance value C2 are set to be equal to each other to simplify the explanation. Therefore, the changing quantity dVB is represented as follows.

$$dVB = (Vd2-Vd1) \times (\tfrac{1}{2}) \quad (2)$$

According to the present exemplary embodiment, the changing quantity of the potential dVB of the second electrode 209 is sufficiently higher than a difference (Vs−Vres) between the potential Vs of the first electrode 201 and the reset voltage Vres. For that reason, the potential of the second electrode 209 becomes lower than the potential of the first electrode 201, and the gradient of the potential of the photoelectric conversion layer 205 is inverted. According to this, electrons indicated by black circles are injected from the first electrode 201 into the photoelectric conversion layer 205. In addition, a part or all of the holes accumulated in the photoelectric conversion layer 205 move towards the blocking layer 203 as the signal carriers. The moved holes are coupled again with a large number of carriers of the blocking layer 203 and disappear. As a result, the holes of the photoelectric conversion layer 205 are discharged from the photoelectric conversion layer 205. In a case where the entirety of the photoelectric conversion layer 205 is to be depleted, all the holes accumulated as the signal carriers are discharged.

Next, in the state illustrated in FIG. 2C, the buffer circuit 12a supplies the first potential Vd1 to the capacitance element 12b. According to this, the gradient of the potential of the photoelectric conversion layer 205 is inverted again. For that reason, the electrons injected into the photoelectric conversion layer 205 in the state illustrated in FIG. 2B are discharged from the photoelectric conversion layer 205. On the other hand, the injection of the holes from the first electrode 201 into the photoelectric conversion layer 205 is suppressed by the blocking layer 203. Therefore, the potential of the node FD changes by a potential Vsig in accordance with the amount of disappearing holes from the reset state. That is, the potential Vsig in accordance with the amount of holes accumulated as the signal carriers appear at the node FD. The potential Vsig in accordance with the amount of accumulated holes will be referred to as optical signal component.

Herein, the selection transistor 16b is turned on in the state illustrated in FIG. 2C. According to this, the amplification transistor 16a outputs the optical signal. A difference between the noise signal read out in step (2) and the optical signal read out in step (4) is a signal based on the potential Vsig in accordance with the accumulated signal carriers.

Figure 2D:
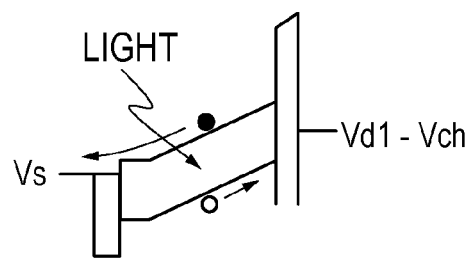

FIG. 2D illustrates a state of the photoelectric conversion unit 101a in step (5). The first electrode 201 is supplied with the potential Vs, and the node FD is supplied with the reset voltage Vres. Since the reset voltage Vres is lower than the potential Vs of the first electrode 201, the electrons of the photoelectric conversion layer 205 are discharged to the first electrode 201. On the other hand, the holes of the photoelectric conversion layer 205 move towards an interface between the photoelectric conversion layer 205 and the insulating layer 207. However, since the holes are not moved to the insulating layer 207, the holes are accumulated in the photoelectric conversion layer 205. In addition, as described above, the injection of the holes into the photoelectric conversion layer 205 is suppressed by the blocking layer 203. Therefore, when light is incident on the photoelectric conversion layer 205 in this state, among the electron-hole pairs generated by the photoelectric conversion, only holes are accumulated in the photoelectric conversion layer 205 as the signal carriers. A potential Vch is a changing potential of the second electrode 209 on the basis of the holes accumulated in the photoelectric conversion layer 205.

In a case where the signal carriers are electrons, it is sufficient when the second potential Vd2 is set as a potential lower than the first potential Vd1. In addition, the conductive type of the blocking layer 203 may be set to be opposite to the conductive type of the blocking layer 203 according to the present exemplary embodiment. For that reason, the gradient of the potential in FIGS. 2A to 2D is inverted. The other operations are the same.

Figure 3:
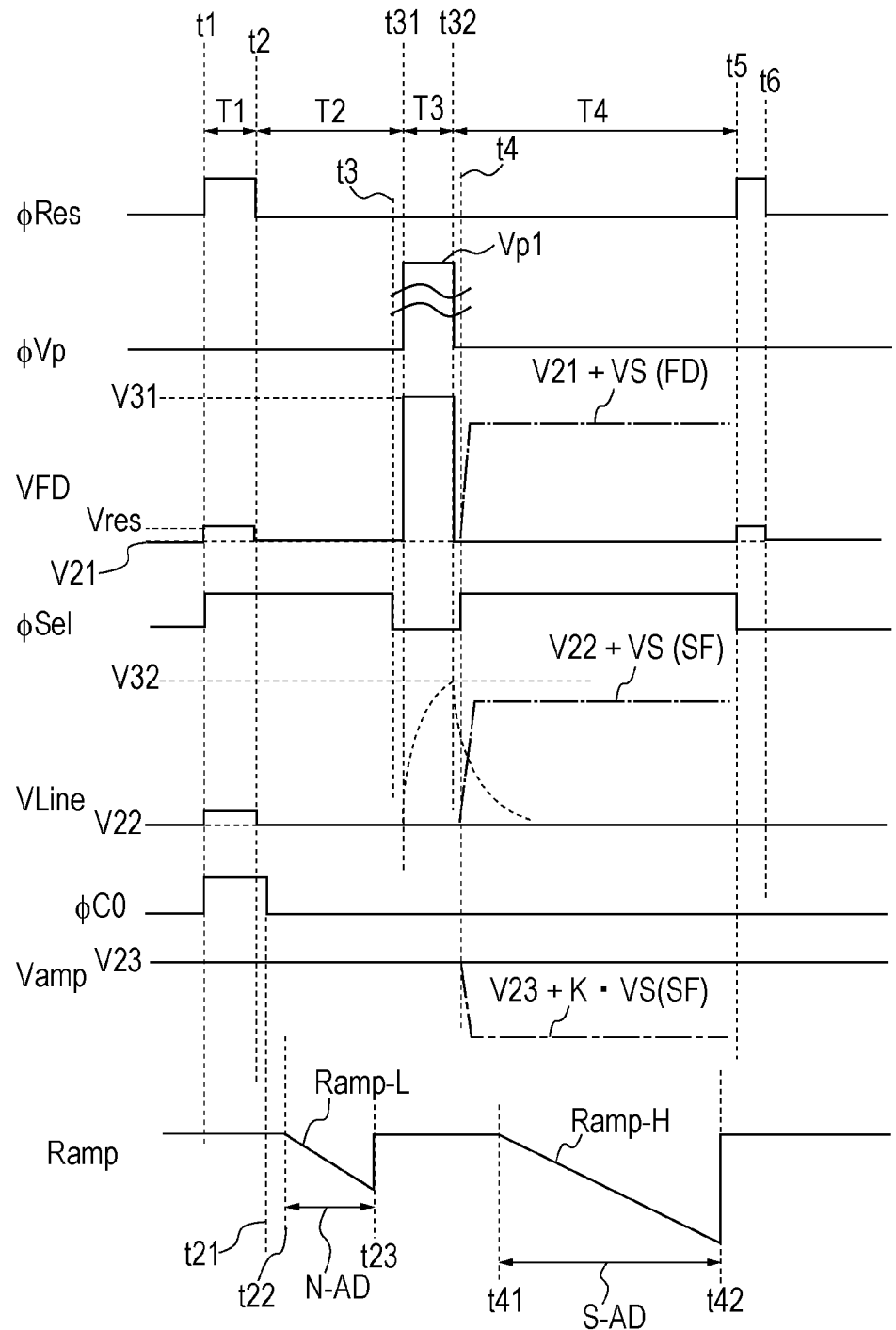
FIG. 3 illustrates an example operation by the photoelectric conversion apparatus.

FIG. 3 illustrates an operation by the photoelectric conversion apparatus illustrated in FIG. 1A.

First, a timing until the signal is read out from the pixel cell 1000 to the vertical signal line 17 will be described.

The reset transistor 14a and the selection transistor 16b illustrated in FIG. 1A are respectively on in sequence when a signal φRes and the signal φSel are at a Hi level (hereinafter, will be referred to as Hi) are respectively off when the signals are at a Lo level (hereinafter, will be referred to as Lo).

A period T1 is a reset period of the node FD, a period T2 is a period during which the node FD is in the floating state, a period T3 is a refresh period of the photoelectric conversion unit 101a, and a period T4 is a signal carrier holding period of the node FD. The photoelectric conversion apparatus according to the present exemplary embodiment sets the amplification transistor 16a to be in a non-operating state in a period from a time t3 to a time t4. The photoelectric conversion unit 101a starts new photoelectric conversion from the time t4 after the refresh operation.

In FIG. 3, the potential of the node FD is denoted by VFD, and the potential of the vertical signal line 17 is denoted by Vline.

At a time before a time t1, the photoelectric conversion unit 101a accumulates the signal carriers.

At the time t1, the vertical scanning circuit that is not illustrated sets the signal level of the signal φRes from Lo to Hi. According to this, the reset transistor 14a is turned on, and both the second electrode 209 and the node FD are reset to the reset voltage Vres.

In addition, at the time t1, the vertical scanning circuit sets the signal φSel from Lo to Hi. According to this, the selection transistor 16b is turned on. According to this, since the current is supplied from the current source 18 to the amplification transistor 16a, the amplification transistor 16a is put into the operating state.

In addition, at the time t1, the timing generator that is not illustrated sets the signal level of the signal φC0 to Hi. According to this, the electric carriers of the capacitance element C1 are reset.

At a time t2, the vertical scanning circuit sets the signal level of the signal φRes to Lo. According to this, the node FD is put into the floating state. A floating potential V21 of the node FD at this time is referred to as reset FD potential. The amplification transistor 16a outputs a signal based on this reset FD potential to the vertical signal line 17. An operation in the period T1 from the time t1 to the time t2 is an operation corresponding to the above-described (2).

Thereafter, at a time t21, the timing generator sets the signal level of the signal φC0 to Lo. According to this, the capacitance element C0 holds the signal based on the reset FD potential that is output from the amplification transistor 16a to the vertical signal line 17.

The signal Vamp at a time t22 is a signal mainly containing an offset component of the column amplification unit 21. This signal will be referred to as offset signal.

Subsequently, in a period from the time t22 to a time t23, the ramp signal Ramp performs change of the potential depending on the time. This period from the time t22 to the time t23 is a period during which the offset signal is converted into a digital signal by the AD conversion unit 22. This period is referred to as N-AD period in FIG. 3. The digital signal based on the offset signal which is obtained by the AD conversion unit 22 is referred to as digital N signal.

At the time t3, the vertical scanning circuit sets the signal φSel to Lo. According to this, since the current from the current source 18 to the amplification transistor 16a is interrupted, the amplification transistor 16a is put into the non-operating state.

At a time t31, the timing generator that is not illustrated sets the signal level of the signal φVp from Lo to the potential Vp1 corresponding to the Hi signal level. According to the present exemplary embodiment, the potential Vp1 is 10 V, and the signal level of the signal φVp at Lo is 0 V. The changing quantity of the potential dVB of the second electrode 209 is calculated by the above-described Expression (2) as dVB=(10−0)×(½)=5 (V). Therefore, the potential of the second electrode 209 becomes a potential obtained by adding 5 V to the reset voltage Vres.

Since the signal φVp at the Hi signal level is input, the holes of the photoelectric conversion layer 205 are refreshed as illustrated in FIG. 2B.

Thereafter, at a time t32, the timing generator sets the signal φVp to Lo. According to this, as illustrated in FIG. 2C, the optical signal is output to the second electrode 209. Thus, the node FD becomes the potential based on the optical signal. This operation corresponds to the above-described step (3). It is noted that FIG. 3 illustrates a case where light hardly streams onto the photoelectric conversion unit 101a. Therefore, the potential of the node FD remains at the reset FD potential.

At the time t4, the vertical scanning circuit sets the signal level of the signal φSel from Lo to Hi. According to this, the current is supplied to the amplification transistor 16a again from the current source 18. Thus, the amplification transistor 16a is put into the operating state. The node FD has the potential based on the optical signal. Thus, the amplification transistor 16a outputs the signal based on the optical signal to the vertical signal line 17. This operation corresponds to the above-described step (4). The signal Vamp of the column amplification unit 21 becomes a potential of a signal (hereinafter, will be referred to as amplified optical signal) obtained by amplifying the signal based on the optical signal output by the amplification transistor 16a.

Thereafter, in a period from a time t41 to a time t42, the ramp signal Ramp performs change of the potential depending on the time. This period from the time t41 to the time t42 is a period during which the amplified optical signal is converted into a digital signal by the AD conversion unit 22. This period is referred to as S-AD period in FIG. 3. The digital signal based on the amplified optical signal which is obtained by the AD conversion unit 22 is referred to as digital S signal.

According to this, the memory 27 on each column holds the digital N signal and the digital S signal. The horizontal scanning circuit that is not illustrated sequentially reads out the digital N signal and the digital S signal from the memory 27 on each column to be output to the external part of the photoelectric conversion apparatus.

According to the present exemplary embodiment, in the period from the time t3 to the time t4 which includes the period from the time t31 to the time t32 during which the refresh operation of the photoelectric conversion unit 101a is performed, the amplification transistor 16a is set to be in the non-operating state. An effect attained by this operation will be described.

A waveform indicated by a broken line in the potential Vline of FIG. 3 represents the potential Vline of the vertical signal line 17 in a case where the amplification transistor 16a is set to be in the operating state in the period from the time t3 to the time t4 for comparison. When the signal level of the signal φVp turns to Hi at the time t31, the potential of the node FD is increased by dVB (=5 V). Thus, the vertical signal line 17 corresponding to the load of the amplification transistor 16a starts to be charged rapidly.

When the signal level of the signal φVp turns to Lo at the time t32, the charging of the vertical signal line 17 is ended, and a potential at that time is set as V32. Since the potential of the node FD is decreased to V21 corresponding to the reset potential, the potential Vline of the vertical signal line 17 decreases from V32 towards V22.

As illustrated in FIG. 3, it takes time since the signal level of the signal φVp turns to Lo at the time t32 until the potential Vline of the vertical signal line 17 is statically determined to be the potential of the signal based on the potential of the optical signal. In order that the AD conversion unit 22 performs AD conversion of the amplified optical signal based on the statically determined potential Vline of the vertical signal line 17, standby for the potential Vline of the vertical signal line 17 to be statically determined is demanded. This standby time of the AD conversion unit 22 becomes a factor of hindering the speeding-up of the photoelectric conversion apparatus.

On the other hand, in a case where the AD conversion unit 22 starts the AD conversion before the potential Vline of the vertical signal line 17 is not sufficiently statically determined for the speeding-up of the photoelectric conversion apparatus, the AD conversion unit 22 performs the AD conversion of the amplified optical signal having the decreased accuracy. Thus, the signal accuracy of the digital S signal is decreased. In particular, in a case where the light does not stream onto the photoelectric conversion unit 101a, the signal accuracy of the amplified optical signal is largely decreased. This is because it takes much time until the potential Vline of the potential of the vertical signal line 17 is statically determined since the potential Vline of the vertical signal line 17 is decreased from the potential V32 to the potential V22. In addition, the decrease in the signal accuracy of the digital S signal in a case where the image is generated by using the signal output by the photoelectric conversion apparatus or a case where the light does not stream onto the photoelectric conversion unit 101a causes a decreased in a quality of a generated image. Since the image generated by using this digital S signal having the decreased signal accuracy turns to an image having an increased luminance of a part that is to be imaged as black, the decrease in the image quality is easily recognized by human eyes. In a case where a time constant fluctuates for each vertical signal line 17 among the plurality of vertical signal lines 17, the discharge amount varies for each vertical signal line 17. According to this, vertical streak patterns are generated in the generated image.

Meanwhile, as illustrated in FIG. 3, the photoelectric conversion apparatus according to the present exemplary embodiment sets the amplification transistor 16a to be in the non-operating state in the period from the time t3 to the time t4. According to this, in the period from the time t3 to the time t4 too, the potential Vline of the vertical signal line 17 remains at the potential of the signal based on the reset FD potential. According to this, it is possible to shorten the period since the signal level of the signal φVp turns to Lo at the time t32 until the potential Vline of the potential of the vertical signal line 17 is statically determined. According to this, the photoelectric conversion apparatus according to the present exemplary embodiment can realize the speeding-up of the photoelectric conversion apparatus. In addition, the photoelectric conversion apparatus according to the present exemplary embodiment can suppress the decrease in the signal accuracy of the signal based on the potential Vline of the vertical signal line 17 in a case where the optical signal of the photoelectric conversion unit is small.

In this manner, in a period from the time t31 to the time t32 during which the signal carriers accumulated by the photoelectric conversion unit 101a are discharged, the photoelectric conversion apparatus according to the present exemplary embodiment sets the amplification transistor 16a to be in the non-operating state. In a period corresponding to a first period from a time before the time t1 to the time t31 during which the photoelectric conversion layer 205 accumulates the signal carriers, the magnitude relationship between the potential Vs of the first electrode 201 and the potential of the second electrode 209 is the first electrode 201<the second electrode 209 corresponding to a first relationship. In a period corresponding to a second period from the time t31 to the time t32 during which the signal carriers are discharged from the photoelectric conversion layer 205, the magnitude relationship between the potential Vs of the first electrode 201 and the potential of the second electrode 209 is the first electrode 201>the second electrode 209 corresponding to a second relationship opposite to the first relationship. Then, in a period corresponding to a third period from a time after the time t32 during which the photoelectric conversion layer 205 can accumulate the signal carriers, the magnitude relationship between the potential Vs of the first electrode 201 and the potential of the second electrode 209 is the first electrode 201<the second electrode 209 that is the same as the first relationship. The photoelectric conversion apparatus according to the present exemplary embodiment sets the amplification transistor 16a to be in the non-operating state in the period from the time t31 to the time t32 during which the magnitude relationship between the first electrode 201 and the potential of the second electrode 209 is the second relationship. According to this, the potential Vline of the vertical signal line 17 is restricted within a predetermined range. The output control unit that puts the amplification transistor 16a into the non-operating state according to the present exemplary embodiment is the selection transistor 16b that interrupts the supply of the current from the current source 18 to the amplification transistor 16a.

Herein, a case where intense light is incident on the photoelectric conversion unit 101a will be described. The potential of the node FD at the period T4 becomes a potential obtained by adding the potential VS (FD) corresponding to the potential based on the signal carriers to the potential V21 as indicated by a chain dot line in FIG. 3. This potential obtained by the potential V21+VS is described as an example as a potential close to a potential V31 to facilitate the understanding in FIG. 3. A potential of the signal output by the amplification transistor 16a corresponds to a potential obtained by the potential V22+VS (SF) in the vicinity of the potential V32. In this case, as in the present exemplary embodiment, when the amplification transistor 16a is set to be in the non-operating state from the time t3 to the time t4, it takes time until the potential Vline of the vertical signal line 17 reaches the potential V22+VS (SF) from the potential V22. In a case where the AD conversion unit 22 starts the AD conversion before the potential Vline of the vertical signal line 17 is statically determined, the decrease in the signal accuracy of the digital S signal occurs. However, in the image generated by using the signal output by the photoelectric conversion apparatus, the decrease in the luminance of the high luminance part is more difficult to be recognized by the human eyes than the increase in the luminance of the part that is to be imaged as black.

It is possible to provide the image in which the increase in the luminance of the part that is to be imaged as black that is easily recognized by the human eyes is suppressed by using the signal output by the photoelectric conversion apparatus according to the present exemplary embodiment. In addition, it is possible to suppress the generation of the vertical streak patterns in the image.

It is noted that, according to the present exemplary embodiment, the example in which the column signal processing unit 20 includes the AD conversion unit 22 has been illustrated. The AD conversion unit may be provided in the external part of the photoelectric conversion apparatus. In this case, the column signal processing unit 20 includes a signal holding unit that holds both the offset signal and the amplified optical signal output by the amplifier 23. The horizontal scanning circuit that is not illustrated sequentially scans the signal holding unit on each of the columns, and the offset signal and the amplified optical signal are both read out from the signal holding unit on each of the columns. The photoelectric conversion apparatus outputs both the offset signal and the amplified optical signal or outputs a signal of a difference between the amplified optical signal and the offset signal to the AD conversion unit provided in the external part of the photoelectric conversion apparatus. The AD conversion unit converts the signal output from the photoelectric conversion unit into a digital signal.

It is noted that, according to the present exemplary embodiment, the example in which the amplification unit is the amplification transistor 16a has been illustrated. Other than that, the amplification unit may be a differential amplifier or a circuit that outputs a signal obtained by amplifying the optical signal like a grounded source circuit. In this case too, the output control unit may set the amplitude of the signal that is output to the vertical signal line 17 to be smaller than a case where the amplification unit outputs the signal on the basis of the potential of the second electrode 209 or may put the amplification unit into the non-operating state. For example, in a case where the amplifier is the differential amplifier, the differential amplifier may be put into the non-operating state by turning off the current source that supplies the current to a differential pair of the differential amplifier. In this case, the circuit that turns off the current source of the differential pair is the output control unit. On the other hand, in a case where the amplification unit is the grounded source circuit, a switch that interrupts the power source voltage supplied to the grounded source circuit may be provided on an electric path between the supply unit of the power source voltage and the grounded source circuit as the output control unit.

It is noted that the photoelectric conversion unit 101a according to the present exemplary embodiment may be a Schottky-type photoelectric conversion unit.

It is noted that, according to the present exemplary embodiment, the example in which the pixel output unit 16 outputs the signal to the vertical signal line 17 provided in each column has been described. As another example, a processing unit having the function of the column signal processing unit 20 is provided in a pixel cell 1000, and the pixel output unit 16 may output the signal to this processing unit. In this case, an electric path between the pixel output unit 16 and the processing unit is a signal line where the potential is controlled by the output control unit in the second period.

The photoelectric conversion apparatus according to the present exemplary embodiment puts the amplification transistor 16a into the non-operating state in the second period during which the signal φVp is at Hi. The present exemplary embodiment is not limited to this example, and the output control unit may put the amplification transistor 16a into the non-operating state at a part of the second period. In this case too, as compared with a case where the amplification transistor 16a is set to be in the operating state over the entire second period, it is possible to reduce the fluctuation of the potential Vline of the vertical signal line 17 while the amplification transistor 16a is set to be in the non-operating state at the part of the second period.

Second Exemplary Embodiment

With regard to the photoelectric conversion apparatus according to the present exemplary embodiment, a different point from the first exemplary embodiment will be mainly described.

Figure 4:
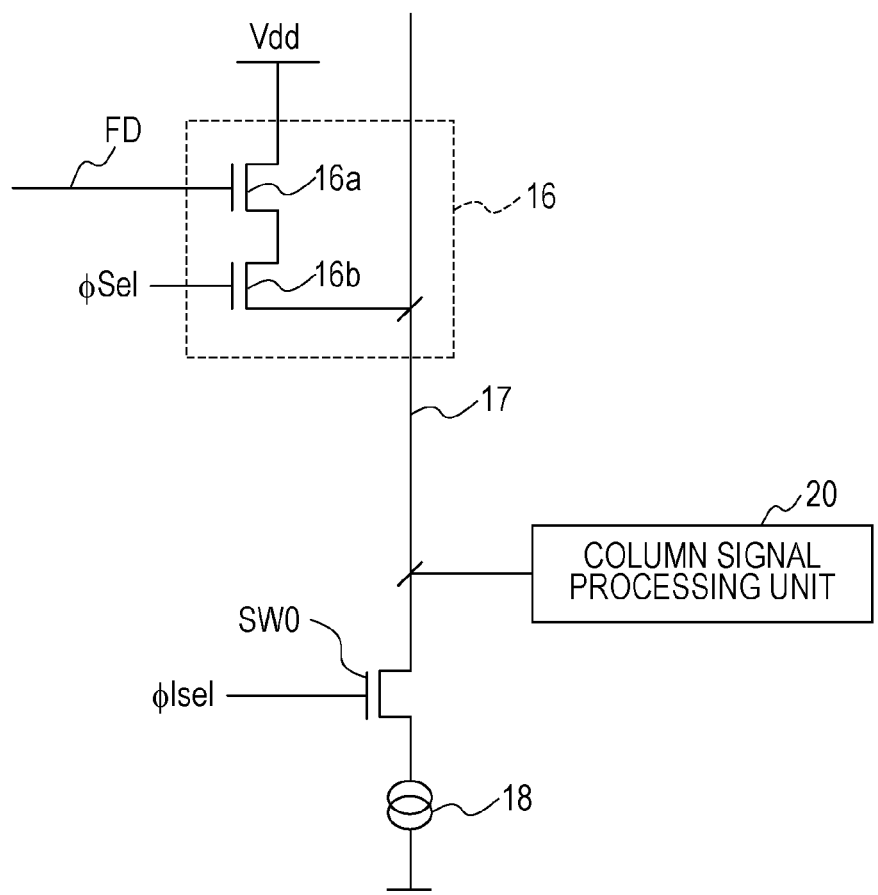
FIG. 4 illustrates an example configuration of the photoelectric conversion apparatus.

FIG. 4 illustrates a part of a configuration of the photoelectric conversion apparatus according to the present exemplary embodiment. In FIG. 4 too, components having the same functions as the components illustrated in FIGS. 1A and 1B are assigned with the same reference symbols assigned in FIGS. 1A and 1B.

FIG. 4 illustrates a configuration in which the pixel output unit 16 is omitted from the pixel cell 1000. The other configurations of the pixel cell 1000 are the same as the configurations of the pixel cell 1000 illustrated in FIGS. 1A and 1B.

The photoelectric conversion apparatus according to the present exemplary embodiment includes a switch SW0 on an electric path between the current source 18 and the selection transistor 16b. The switch SW0 is on when a signal level of a signal φIsel output from the timing generator that is not illustrated is at Hi and is off when the signal level is at Lo.

The operation by the photoelectric conversion apparatus according to the present exemplary embodiment is the same as the operation illustrated in FIG. 3 except for the signal level of the signal φSel from the time t3 to the time t4 and the signal φIsel.

In the photoelectric conversion apparatus according to the present exemplary embodiment, the signal level of the signal φSel remains to Hi in the period from the time t3 to the time t4 too. On the other hand, the timing generator sets the signal level of the signal φIsel to Lo in the period from the time t3 to the time t4 to turn the switch SW0 off in the photoelectric conversion apparatus according to the present exemplary embodiment. According to this, in the period from the time t31 to the time t32, the supply of the current from the current source 18 to the amplification transistor 16a is interrupted. In the other periods, the timing generator sets the signal level of the signal φIsel to Hi to turn the switch SW0 on. According to this, in the other periods, while the signal φSel is at Hi, the amplification transistor 16a is supplied with the current from the current source 18.

In the photoelectric conversion apparatus according to the present exemplary embodiment too, the amplification transistor 16a can be put into the non-operating state in the second period described in the first exemplary embodiment. Therefore, the potential Vline of the vertical signal line 17 is restricted within the predetermined range. According to this, the same effect described in the first exemplary embodiment can be also attained by the photoelectric conversion apparatus according to the present exemplary embodiment.

It is noted that the period during which the signal level of the signal φIsel is set to Lo may be at least the period from the time t31 to the time t32 during which the signal level of the signal φVp is at Hi.

The output control unit according to the present exemplary embodiment which puts the amplification transistor 16a into the non-operating state is the switch SW0 that interrupts the supply of the current from the current source 18 to the amplification transistor 16a.

Third Exemplary Embodiment

With regard to the photoelectric conversion apparatus according to the present exemplary embodiment, a different point from the first exemplary embodiment will be mainly described.

Figure 5:
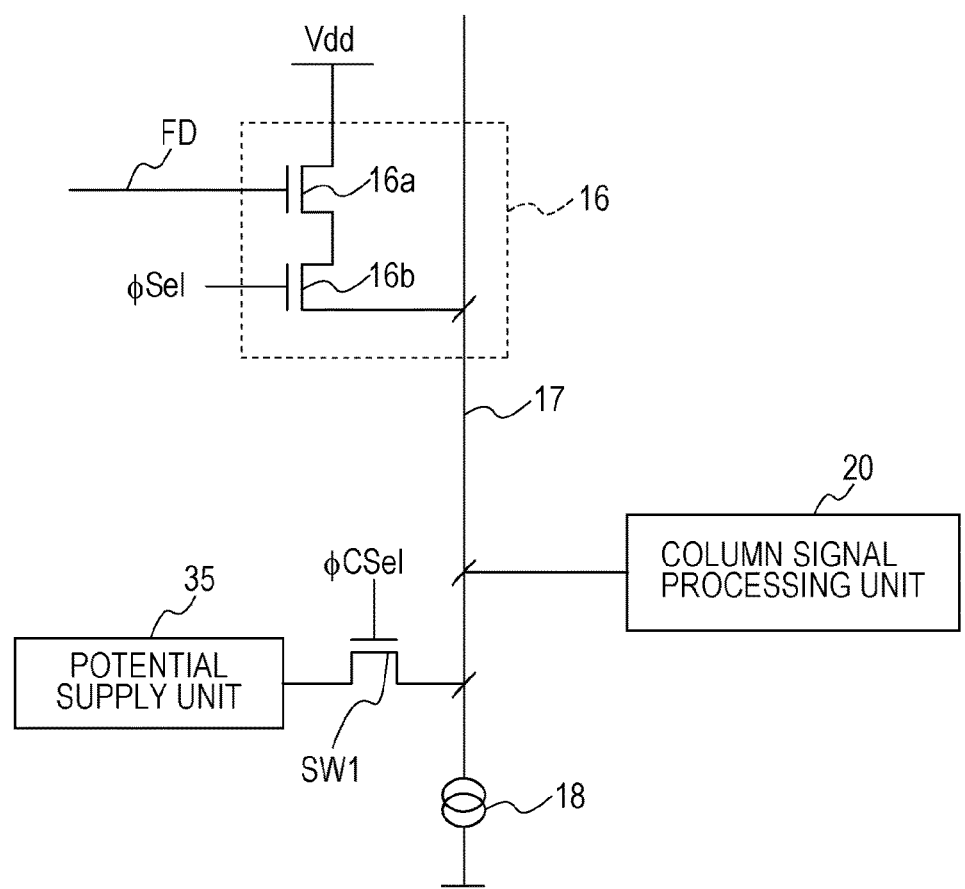
FIG. 5 illustrates an example of the photoelectric conversion apparatus.

FIG. 5 illustrates a part of a configuration of the photoelectric conversion apparatus according to the present exemplary embodiment. In FIG. 5 too, components having the same functions as the components illustrated in FIG. 5 are assigned with the same reference symbols assigned in FIGS. 1A and 1B.

FIG. 5 illustrates a configuration in which the pixel output unit 16 is omitted from the pixel cell 1000. The other configurations of the pixel cell 1000 are the same as the configurations of the pixel cell 1000 illustrated in FIGS. 1A and 1B.

The photoelectric conversion apparatus according to the present exemplary embodiment includes the switch SW1 electrically connected to the vertical signal line 17 and a potential supply unit 35. The switch SW1 is on when a signal level of a signal φCsel output from the timing generator that is not illustrated is at Hi and is off when the signal level is at Lo. The potential supply unit 35 is a circuit that supplies a potential to the vertical signal line 17 such that the potential Vline of the vertical signal line 17 does not become higher than or equal to a predetermined potential.

The operation by the photoelectric conversion apparatus according to the present exemplary embodiment is the same as the operation illustrated in FIG. 3 except for the signal level of the signal φSel from the time t3 to the time t4 and the signal φCsel.

In the photoelectric conversion apparatus according to the present exemplary embodiment, the signal level of the signal φSel remains at Hi in the period from the time t3 to the time t4 too. On the other hand, the timing generator sets the signal level of the signal φCsel to Hi in the period from the time t3 to the time t4 to turn the switch SW1 on in the photoelectric conversion apparatus according to the present exemplary embodiment. According to this, the potential Vline of the vertical signal line 17 is clipped at the potential output by the potential supply unit 35. Thus, the potential Vline of the vertical signal line 17 becomes a potential having a smaller amplitude than the signal that is output by the amplification transistor 16a on the basis of the potential V31 of the node FD.

It is noted that, in a period other than the period from the time t3 to the time t4, the timing generator sets the signal level of the signal φCsel to Lo to turn the switch SW1 off.

According to this, the photoelectric conversion apparatus according to the present exemplary embodiment can set the potential Vline of the vertical signal line 17 in the second period described in the first exemplary embodiment to be the potential having the smaller amplitude than the potential of the signal output by the amplification transistor 16a. That is, the output control unit sets a range of the amplitude in which the potential Vline of the vertical signal line 17 is changed to be smaller than a range of the amplitude that can be output by the amplification transistor 16a. That is, the potential Vline of the vertical signal line 17 is restricted within the predetermined range. Thus, the photoelectric conversion apparatus according to the present exemplary embodiment can also attain the same effect as the photoelectric conversion apparatus according to the first exemplary embodiment.

It is noted that the period during which the signal level of the signal ϕCsel is set to Lo may be at least the period from the time t31 to the time t32 during which the signal level of the signal ϕVp is at Hi.

The potential supplied by the potential supply unit 35 when the signal level of the signal ϕCsel is at Hi may be higher than or equal to the potential V22 and also lower than the potential V32. In one embodiment, the potential supplied by the potential supply unit 35 is the potential V22.

It is noted that, according to the present exemplary embodiment, the timing generator sets the signal ϕCsel to Lo in the period after the time t4 during which the amplification transistor 16a outputs the signal based on the optical signal. As another example, during this period, the timing generator may set the signal ϕCsel to Hi. In this case, the potential supply unit 35 may be operated to suppress the potential Vline of the vertical signal line 17 so as not to become higher than or equal to a predetermined potential.

It is noted that the output control unit according to the present exemplary embodiment in which the amplification transistor 16a sets the amplitude of the signal that is output to the vertical signal line 17 to be smaller than that in a case where the signal is output on the basis of the potential of the second electrode 209 is the potential supply unit 35.

Fourth Exemplary Embodiment

With regard to the photoelectric conversion apparatus according to the present exemplary embodiment, a different point from the first exemplary embodiment will be mainly described.

FIG. 6 illustrates a configuration of the photoelectric conversion apparatus according to the present exemplary embodiment. In FIG. 6 too, components having the same functions as the components illustrated in FIG. 6 are assigned with the same reference symbols assigned in FIGS. 1A and 1B.

The unit pixel 10a includes the photoelectric conversion unit 101a and a transfer transistor 15a. A unit pixel 10b includes a photoelectric conversion unit 101b and a transfer transistor 15b. The photoelectric conversion unit 101a includes the first electrode 201, the blocking layer 203, the photoelectric conversion layer 205, the insulating layer 207, and the second electrode 209. The blocking layer 203 is provided between the first electrode 201 and the photoelectric conversion layer 205, and the photoelectric conversion layer 205 is provided between the blocking layer 203 and the insulating layer 207. The insulating layer 207 is provided between the photoelectric conversion layer 205 and the second electrode 209. The configuration of the photoelectric conversion unit 101b is the same as the configuration of the photoelectric conversion unit 101a. Each of the transfer transistors 15a and 15b is provided so as to correspond to each of the plurality of photoelectric conversion units 101a and 101b. Each of the transfer transistors 15a and 15b is a transfer unit that transfers the optical signal of each of the plurality of photoelectric conversion units 101a and 101b to the amplification transistor 16a corresponding to the amplification unit.

The transfer transistor 15a is electrically connected to the second electrode 209 of the photoelectric conversion unit 101a. The transfer transistor 15b is electrically connected to a second electrode of the photoelectric conversion unit 101b. A signal ϕT1 is input to a gate of the transfer transistor 15a from the vertical scanning circuit that is not illustrated. A signal ϕT2 is input to a gate of the transfer transistor 15b from the vertical scanning circuit that is not illustrated.

A power source unit 30b supplies the potential Vs to a first electrode of the photoelectric conversion unit 101b.

Figure 7A:
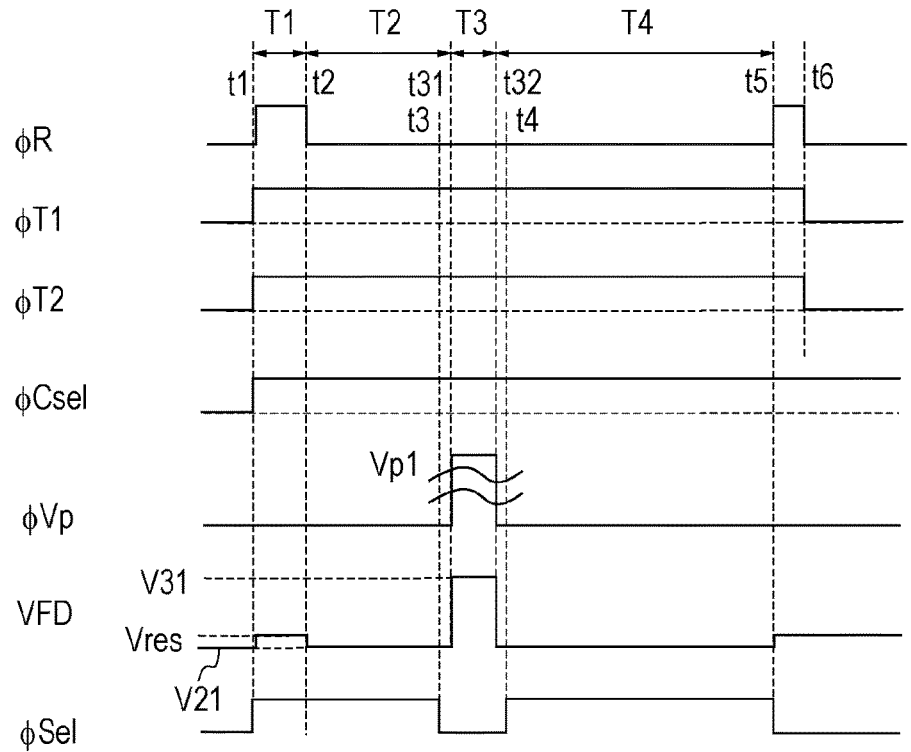
FIG. 7A illustrates an example operation by the photoelectric conversion apparatus.

FIG. 7A illustrates an operation by the photoelectric conversion apparatus illustrated in FIG. 6. In the operation illustrated in FIG. 7A, the optical signals of both the two photoelectric conversion units 101a and 101b are added at the node FD to each other. The amplification transistor 16a outputs a signal to the vertical signal line 17 on the basis of the potential of the node FD that has a potential of this added optical signal.

The vertical scanning circuit sets the signal level of the signal ϕT1 to Hi in a period from the time t1 to a time t6. The vertical scanning circuit also sets the signal level of the signal ϕT1 to Hi and the signal level of the signal ϕT2 to Hi in the period from the time t1 to the time t6.

The vertical scanning circuit sets the signal level of the signal ϕVp to Hi in the period from the time t31 to the time t32. According to this, the optical signal is output from both the two photoelectric conversion units 101a and 101b to the node FD. At the node FD, the optical signals of these two photoelectric conversion units 101a and 101b are added to each other.

The vertical scanning circuit sets the signal level of the signal ϕSel to Lo in the period from the time t3 to the time t4 including the period from the time t31 to the time t32. According to this, since the current from the current source 18 to the amplification transistor 16a is interrupted, the amplification transistor 16a is put into the non-operating state.

At the time t4, the vertical scanning circuit sets the signal level of the signal ϕSel to Hi. According to this, the amplification transistor 16a is supplied with the current again from the current source 18. Thus, the amplification transistor 16a is put into the operating state. The node FD has the potential based on the optical signal. Thus, the amplification transistor 16a outputs a signal based on the potential of the signal obtained by adding the optical signals of the photoelectric conversion units 101a and 101b to each other to the vertical signal line 17.

According to this, the photoelectric conversion apparatus according to the present exemplary embodiment can also attain the same effect as the first exemplary embodiment.

The output control unit according to the present exemplary embodiment which puts the amplification transistor 16a into the non-operating state is the selection transistor 16b that interrupts the supply of the current from the current source 18 to the amplification transistor 16a.

It is noted that the potential Vp1 according to the present exemplary embodiment corresponding to the Hi signal level of the signal ϕVp is 3/2 times the Hi signal level of the potential Vp1 according to the first exemplary embodiment when the capacitance values of the photoelectric conversion units 101a and 101b are the same.

The changing quantity of the potential dVB of the second electrode 209 which is represented by the above-described Expression (1) is represented as follows while a capacitance value of the photoelectric conversion unit 101b is set as C3 in the operation illustrated in FIG. 7A.

$$dVB=(Vd2-Vd1)\times C1/(C1+C2+C3) \quad (3)$$

As described above, in a case where C1=C2=C3 is established, Expression (3) is rewritten as follows.

$$dVB=(Vd2-Vd1)\times(\tfrac{1}{3}) \quad (4)$$

Since Vd1=0 (V) is set in order that the changing quantity of the potential dVB of the second electrode 209 in each of the photoelectric conversion unit 101*a* and the photoelectric conversion unit 101*b* is set to be 5 V that is the same as the operation of FIG. 3, Vd2=15 (V) is set. Thus, the potential Vp1 is set as 15 V. In contrast to a case where the optical signals are individually read out from the photoelectric conversion unit 101*a* and the photoelectric conversion unit 101*b* as in FIG. 3, the potential Vp1 is multiplied by 3/2 in a case where the optical signals are read out at the same time from the two photoelectric conversion units 101*a* and 101*b* as in FIG. 7A.

Figure 7B:
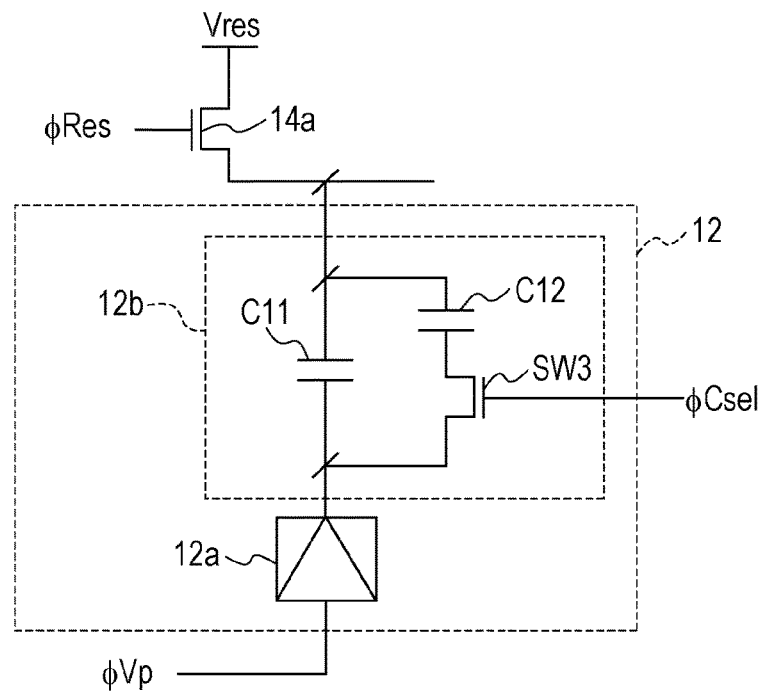
FIG. 7B illustrates an example configuration of a capacitance element.

A case will be described where the potential Vp1 is set to be the same in a case where the optical signals are individually read out from the photoelectric conversion unit 101*a* and the photoelectric conversion unit 101*b* and a case where the optical signals are read out at the same time from the photoelectric conversion units 101*a* and 101*b*. In one embodiment, the capacitance value of the capacitance element 12*b* is doubled in a case where the optical signals are read out at the same time from the two photoelectric conversion units 101*a* and 101*b* as compared with a case where the optical signals are individually read out from the photoelectric conversion unit 101*a* and the photoelectric conversion unit 101*b*. FIG. 7B illustrates a configuration of the capacitance element 12*b* in which the capacitance value is variable as described above. The capacitance element 12*b* includes capacitance elements C11 and C12 and a switch SW3. Capacitance values of the capacitance elements C11 and C12 are set to be equal to each other. In a case where the optical signals are individually read out from the photoelectric conversion unit 101*a* and the photoelectric conversion unit 101*b*, the timing generator sets the signal level of the signal ϕCsel to Lo to turn the switch SW3 off. According to this, the buffer circuit 12*a* does not supply the signal ϕVp to the capacitance element C12 but supplies the signal ϕVp to the capacitance element C11. On the other hand, in a case where the optical signals are read out at the same time from the two photoelectric conversion units 101*a* and 101*b*, the timing generator sets the signal level of the signal ϕCsel to Hi. According to this, the buffer circuit 12*a* supplies the signal ϕVp to both the capacitance elements C11 and C12.

Thus, the capacitance value of the capacitance element 12*b* in FIG. 7B can be doubled in a case where the optical signals are read out at the same time from the two photoelectric conversion units 101*a* and 101*b* as compared with a case where the optical signals are individually read out from the photoelectric conversion unit 101*a* and the photoelectric conversion unit 101*b*.

In the photoelectric conversion apparatus according to the present exemplary embodiment, the switch SW0 may be provided on the electric path between the current source 18 and the selection transistor 16*b* as in the photoelectric conversion apparatus according to the second exemplary embodiment.

In addition, in the photoelectric conversion apparatus according to the present exemplary embodiment, the potential supply unit 35 that supplies the potential to the vertical signal line 17 and the switch SW1 that switches a conductive state and a non-conductive state of the electric path between the potential supply unit 35 and the vertical signal line 17 may be provided as in the photoelectric conversion apparatus according to the third exemplary embodiment.

Figure 10:
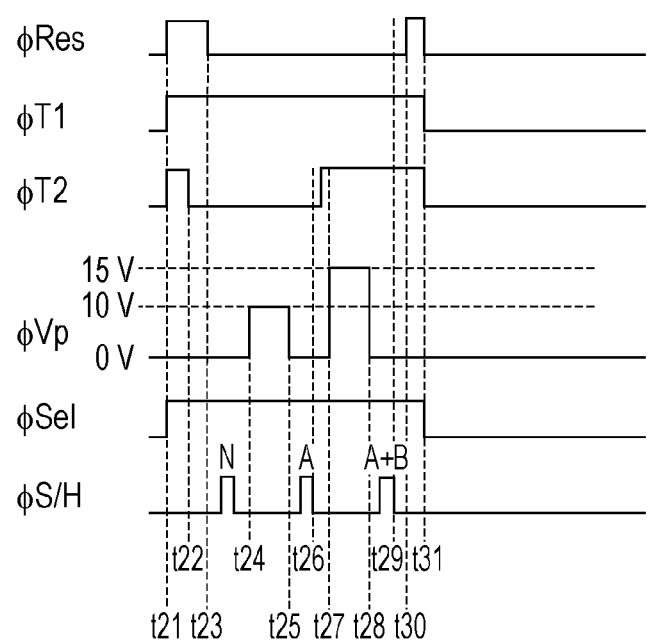
FIG. 10 illustrates an example operation by the photoelectric conversion apparatus.

Moreover, the photoelectric conversion apparatus according to the present exemplary embodiment may combine the operation of individually reading out the optical signal from each of the plurality of photoelectric conversion units with the operation of reading out the signal obtained by adding the optical signals of the plurality of photoelectric conversion units to each other illustrated in FIG. 7A. An example of the above-described operation will be illustrated in FIG. 10.

A period from the time t21 to a time t26 is a period during which an operation related to the reading of the noise signal and the optical signal of the photoelectric conversion unit 101*a* is performed. A period from a time t27 to the time t31 is a period during which an operation related to the reading of the signal obtained by adding the optical signals of the photoelectric conversion unit 101*a* and the photoelectric conversion unit 101*b* to each other is performed. With this operation, the signal holding unit holds an A signal corresponding to a signal obtained by amplifying the optical signal of the photoelectric conversion unit 101*a* by the amplification transistor 16*a* and an amplifier 19 at the time t26. At a time t29, the signal holding unit holds an A+B signal corresponding to a signal obtained by amplifying the signal, which is obtained by adding the optical signals of the photoelectric conversion unit 101*a* and the photoelectric conversion unit 101*b* to each other, by the amplification transistor 16*a* and the amplifier 19. The photoelectric conversion apparatus outputs both the A signal and the A+B signal to the external part of the photoelectric conversion apparatus.

Herein, an example of a photoelectric conversion system including the photoelectric conversion apparatus and an output signal processing unit configured to process the signal output by the photoelectric conversion apparatus will be described. The output signal processing unit provided in the external part of the photoelectric conversion apparatus can obtain a B signal by subtracting the A signal from the A+B signal. The B signal generated by the output signal processing unit is a signal equivalent to the signal obtained by amplifying the optical signal of the photoelectric conversion unit 101*b* by the amplification transistor 16*a* and the amplifier 19. A case where the photoelectric conversion apparatus further includes a micro lens array in which a plurality of micro lenses are provided, and one micro lens is provided to each of the photoelectric conversion units 101*a* and 101*b* is conceivable. In this case, lights ejected from mutually different exit pupils of an optical system that guides light to the photoelectric conversion apparatus are incident on each of a plurality of photoelectric conversion units 191*a* and 101*b*. In the case of this configuration, the output signal processing unit can detect a phase difference between the light incident on the photoelectric conversion unit 101*a* and the light incident on the photoelectric conversion unit 101*b* by the B signal generated by the output signal processing unit and the A signal output by the photoelectric conversion apparatus. According to this, the photoelectric conversion system including the photoelectric conversion apparatus and the output signal processing unit can perform focus detection based on a phase difference detection system. In addition, the output signal processing unit can generate an image by using the A+B signal output from the photoelectric conversion apparatus.

According to the present exemplary embodiment, the configuration has been described in which the two photoelectric conversion units 101*a* and 101*b* share the single capacitance element 12*b* and the single amplification transistor 16*a*. It is sufficient when a plurality of photoelectric conversion units are shared by the single capacitance element 12*b* and the single amplification transistor 16*a*. In the plurality of photoelectric conversion units 101 commonly electrically connected to the node FD, in a case where the number of the optical signals read out at the same time to the node FD is M that is higher than N (N is an integer higher than or equal to 1), the Hi signal level of the signal φVp is set to be still higher as compared with a case where the above-described number of the optical signals is N. This corresponds to a case where the signal carriers accumulated by the photoelectric conversion units 101 are holes. In a case where the signal carriers accumulated by the photoelectric conversion units 101 are electrons, when the number of the optical signals read out at the same time to the node FD M that is higher than N (N is an integer higher than or equal to 1), the Hi signal level of the signal φVp is set to be still lower as compared with a case where the above-described number of the optical signals is N.

A case also exists where color filters of RGB are arranged in the Bayer pattern, and each of the plurality of photoelectric conversion units is provided so as to correspond to each color. In this case, the single capacitance element 12*b* and the single amplification transistor 16*a* may be shared by the plurality of photoelectric conversion units on which the color filters of the same color are arranged.

According to the present exemplary embodiment, the configuration in which the single amplification transistor 16*a* is shared by the plurality of photoelectric conversion units 101*a* and 101*b* has been described. As another example, a configuration may be adopted in which each of the plurality of amplification transistors 16*a* is provided to each of the plurality of photoelectric conversion units 101*a* and 101*b*. For example, in the case of a configuration where the plurality of pixel cells 1000 are arranged in a matrix, each of the plurality of pixel cells 1000 includes the same number of the amplification transistors 16*a* as the number of photoelectric conversion units provided in each of the pixel cells 1000. Furthermore, a configuration in which the pixel cells 1000 belonging to a same row share the single capacitance element 12*b* may be adopted. In the configuration in which the plurality of capacitance elements 12*b* are provided, each of the plurality of buffer circuits 12*a* is provided so as to correspond to each of the plurality of capacitance elements 12*b*. Since the buffer circuit 12*a* is provided so as to correspond to the capacitance element 12*b* in the above-described manner, it is possible to reduce the load on the capacitance potential supply unit.

Fifth Exemplary Embodiment

With regard to the photoelectric conversion apparatus according to the present exemplary embodiment, a different point from the fourth exemplary embodiment will be mainly described.

Figure 8:
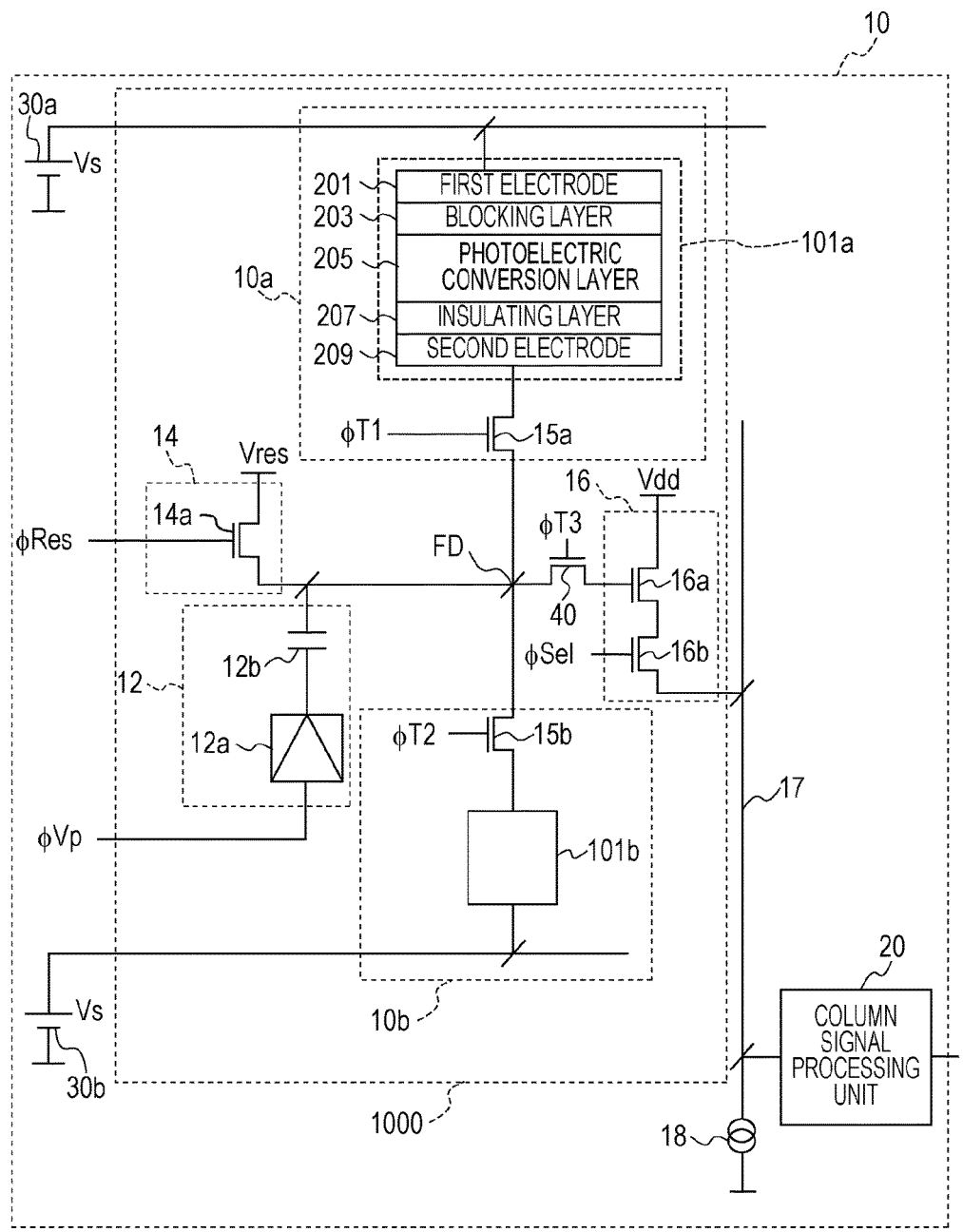
FIG. 8 illustrates an example of the photoelectric conversion apparatus.

FIG. 8 illustrates a configuration of the photoelectric conversion apparatus according to the present exemplary embodiment. The photoelectric conversion apparatus according to the present exemplary embodiment includes a transistor 40 between the node FD and the input node of the amplification transistor 16*a*. The transistor 40 is on when a signal level of a signal φT3 output from the vertical scanning circuit is at Hi and is off when the signal level of the signal φT3 is at Lo. That is, the transistor 40 is a second switch that switches a conductive state and a non-conductive state of the electric path between the node FD corresponding to a third node where the second electrode 209 is electrically connected to the capacitance element 12*b* and the input node of the amplification transistor 16*a*.

The operation by the photoelectric conversion apparatus according to the present exemplary embodiment is the same as the operation of FIG. 7A described in the fourth exemplary embodiment except for the signal φSel and the signal φT3. In the photoelectric conversion apparatus according to the present exemplary embodiment, the vertical scanning circuit sets the signal level of the signal φSel to Hi in the period from the time t3 to the time t4 too. On the other hand, the vertical scanning circuit sets the signal level of the signal φT3 to Lo in the period from the time t3 to the time t4. The vertical scanning circuit sets the signal level of the signal φT3 to Hi in a period other than the period from the time t3 to the time t4.

According to this, in the period from the time t31 to the time t32 during which the signal level of the signal φVp turns to Hi, the node FD and the input node of the amplification transistor 16*a* are put into the non-conductive state. Thus, the photoelectric conversion apparatus according to the present exemplary embodiment can also attain the same effect as the photoelectric conversion apparatus according to the fourth exemplary embodiment.

It is noted that the output control unit according to the present exemplary embodiment which sets the amplitude of the signal that is output to the vertical signal line 17 to be smaller as compared with a case where the amplification transistor 16*a* outputs the signal on the basis of the potential of the second electrode 209 is the transistor 40.

Sixth Exemplary Embodiment

Figure 9:
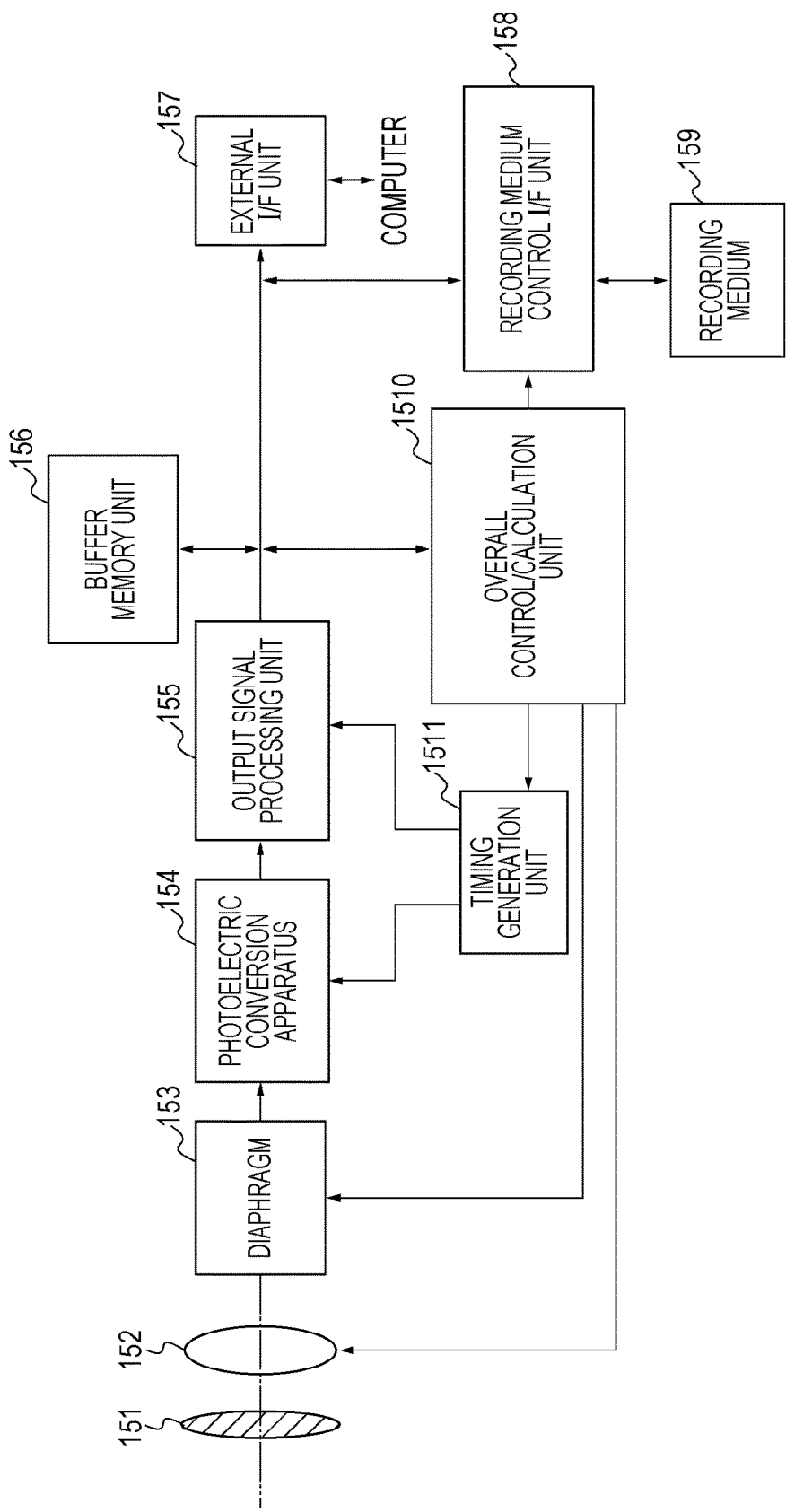
FIG. 9 illustrates an example configuration of a photoelectric conversion system.

The photoelectric conversion apparatus according to the above-described first to fifth exemplary embodiments can be applied to various photoelectric conversion systems. Examples of the photoelectric conversion system include a digital still camera, a digital camcorder, a monitoring camera, and the like. FIG. 9 is a schematic diagram of the photoelectric conversion system in which the photoelectric conversion apparatus according to any one of the first to fifth exemplary embodiments of the first to fifth exemplary embodiments is applied to the digital still camera as an example of the photoelectric conversion system.

The photoelectric conversion system exemplified in FIG. 9 includes a photoelectric conversion apparatus 154, a barrier 151 that projects a lens, a lens 152 that forms an optical image of a subject onto the photoelectric conversion apparatus 154, and a diaphragm 153 that sets the quantity of light that passes through the lens 152 to be variable. The lens 152 and the diaphragm 153 are an optical system in which light is focused on the photoelectric conversion apparatus 154. The photoelectric conversion system exemplified in FIG. 9 also includes an output signal processing unit 155 that performs processing on an output signal that is output from the photoelectric conversion apparatus 154.

The output signal processing unit 155 performs AD conversion for converting an analog signal output by the photoelectric conversion apparatus 154 into a digital signal. In addition, the output signal processing unit 155 also performs operation of outputting image data while various corrections and compressions are performed when necessary.

The photoelectric conversion system exemplified in FIG. 9 further includes a buffer memory unit 156 that temporarily stores the image data and an external interface unit (external I/F unit) 157 that establishes a communication with an external computer or the like. The photoelectric conversion system further includes a recording medium 159 such as a semiconductor memory for performing recording or reading of picked-up image data and a recording medium control interface unit (recording medium control I/F unit) 158 for performing recording or reading in the recording medium 159. It is noted that the recording medium 159 may be built in the photoelectric conversion system or may be detachably attached.

The photoelectric conversion system further includes an overall control/calculation unit 1510 that controls various calculations and the entire digital still camera and a timing generation unit 1511 that outputs various timing signals to the photoelectric conversion apparatus 154 and the output signal processing unit 155. Herein, the timing signals or the like may be output from an external part, and it is sufficient when the photoelectric conversion system includes at least the photoelectric conversion apparatus 154 and the output signal processing unit 155 that processes the output signal that is output from the photoelectric conversion apparatus 154. As described above, with the application of the photoelectric conversion apparatus 154, the photoelectric conversion system according to the present exemplary embodiment can perform image pickup operation.

The output signal processing unit 155 may also perform the phase difference detection by using the signal output by the photoelectric conversion apparatus 154 as described in the fourth exemplary embodiment.

It is noted that each of the above-described exemplary embodiments is merely a specific example for carrying out the present invention, and a technical scope of the present invention is not to be construed in a limited manner by these exemplifications. That is, the present invention can be carried out in various modes without departing from the technical concept or the main characteristic. In addition, the above-described exemplary embodiments can be combined with each other in various manners and carried out.

According to the exemplary embodiments of the present invention, the speeding-up of the photoelectric conversion apparatus and the improvement in the accuracy of the signal based on the optical signal in a case where the signal level of the optical signal is small can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-156784, filed Jul. 31, 2014, which is hereby incorporated by reference herein in its entirety.

What is claimed is:

1. A photoelectric conversion apparatus comprising:
a photoelectric conversion unit;
a signal line;
a reset unit having an input node, and an output node connected to a floating diffusion node;
a driving unit connected to the floating diffusion node;
an amplification unit having an input node, and an output node connected to the signal line; and
an output control unit, wherein the photoelectric conversion unit includes a first electrode, a second electrode, a photoelectric conversion layer that is arranged between the first electrode and the second electrode and accumulates signal carriers, and an insulating layer arranged between the photoelectric conversion layer and the second electrode, a magnitude relationship between a potential applied to the first electrode and a first potential applied to the second electrode by the driving unit is a first relationship in a first period, in the first period, the input node is supplied with a potential corresponding to the first potential, and the amplification unit outputs a signal corresponding to the potential of the input node, to the signal line, in a second period, the magnitude relationship is in a second relationship that is opposite of the first relationship by changing a potential applied to the second electrode by the driving unit from the first potential to a second potential, in a third period, during which the amplification unit outputs a signal corresponding to a potential of the input node, the potential of the input node corresponds to the signal carriers accumulated by the photoelectric conversion layer during the third period, the magnitude relationship is in the first relationship, the second period is a period between the first period and the third period, and the output control unit sets a potential range of the output node in the second period to be smaller than each of a potential range of the output node in the first period and a potential range of the output node in the third period, or the output control unit puts the amplification unit into a non-operating state in at least a part of the second period.

2. The photoelectric conversion apparatus according to claim 1, wherein
the magnitude relationship is the first relationship in the third period during which the photoelectric conversion layer accumulates the signal carriers while the second electrode is applied with the first potential by the driving unit.

3. The photoelectric conversion apparatus according to claim 1, further comprising:
a current source connected to the signal line; and
a selection transistor, wherein
the amplification unit is an amplification transistor,
an input node of the amplification transistor is the input node of the amplification unit,
a current is supplied from the current source to the amplification transistor when the selection transistor is put into a conductive state, and
the selection transistor is the output control unit that puts an electric path between the amplification transistor and the signal line into a non-conductive state in at least a part of the second period to put the amplification transistor into the non-operating state.

4. The photoelectric conversion apparatus according to claim 1, further comprising:
a current source connected to the signal line; and
a switch that switches a conductive state and a non-conductive state of an electric path between the current source and the amplification unit, wherein
the amplification unit is an amplification transistor, and
a current is supplied from the current source to the amplification transistor when the switch is put into a conductive state, and the switch is the output control unit that puts the electric path between the current source and the amplification transistor into the non-conductive state in at least a part of the second period to put the amplification transistor into the non-operating state.

5. The photoelectric conversion apparatus according to claim 1, wherein the photoelectric conversion unit further includes a current source connected to the signal line and a potential supply unit that supplies a potential to the signal line, the amplification unit is an amplification transistor, and the potential supply unit is the output control unit that supplies the potential to the signal line in at least a part of the second period to set an amplitude of a signal output to the signal line to be smaller as compared with a case where the amplification transistor outputs a signal on the basis of the potential of the second electrode.

6. The photoelectric conversion apparatus according to claim 1, further comprising:

a capacitance element including a first node and a second node, wherein the first node is connected to the second electrode, a third potential is supplied to the second node in the first period, and a fourth potential is supplied to the second node in the second period.

7. The photoelectric conversion apparatus according to claim 6, further comprising:

a second switch, wherein the second switch is the output control unit that puts an electric path between a third node at which the second electrode is connected to the first node and an input node of the amplification unit into a non-conductive state in at least a part of the second period to set an amplitude of a signal output to the signal line to be smaller as compared with a case where the amplification unit outputs a signal based on the potential of the second electrode.

8. The photoelectric conversion apparatus according to claim 6, further comprising:

a plurality of photoelectric conversion units, wherein the first node is commonly connected to each of the plurality of photoelectric conversion units.

9. The photoelectric conversion apparatus according to claim 8, wherein electric paths between only a part of photoelectric conversion units among the plurality of photoelectric conversion units and the amplification unit are all put into a conductive state, and the optical signals are output from the second electrodes of the part of photoelectric conversion units to the amplification unit, and thereafter, electric paths between all the photoelectric conversion units among the plurality of photoelectric conversion units and the amplification unit are all put into a conductive state, and a signal obtained by adding the optical signals output from the respective second electrodes of all the photoelectric conversion units to each other is output to the amplification unit.

10. The photoelectric conversion apparatus according to claim 9, wherein one micro lens is provided with respect to the plurality of photoelectric conversion units.

11. The photoelectric conversion apparatus according to claim 9, wherein light is incident on the photoelectric conversion apparatus from an optical system, lights ejected from mutually different exit pupils of the optical system are incident on each of the plurality of photoelectric conversion units, thereafter, electric paths between all the photoelectric conversion units among the plurality of photoelectric conversion units and the amplification unit are all put into a conductive state, and a signal obtained by adding the optical signals output from the respective second electrodes of all the photoelectric conversion units to each other is output to the amplification unit.

12. The photoelectric conversion apparatus according to claim 8, further comprising:

a plurality of transfer units each provided so as to corresponding to each to the plurality of photoelectric conversion units, each of the plurality of transfer units transfers the optical signal based on the signal carriers from the second electrode of each of the plurality of photoelectric conversion units to the amplification unit, and the first node is connected to each of the plurality of photoelectric conversion units via each of the plurality of transfer units.

13. The photoelectric conversion apparatus according to claim 12, wherein a capacitance value of the capacitance element is a first capacitance value in a case where only one transfer unit among the plurality of transfer units is on in a period during which the photoelectric conversion layer accumulates the signal carriers, and the capacitance value of the capacitance element is a second capacitance value that is higher than the first capacitance value in a case where plural transfer units among the plurality of transfer units is on in the period during which the photoelectric conversion layer accumulates the signal carriers, the plurality of transfer units.

14. The photoelectric conversion apparatus according to claim 6, further comprising:

a capacitance potential supply unit, wherein the capacitance potential supply unit supplies the third potential and the fourth potential to the second node.

15. The photoelectric conversion apparatus according to claim 8, further comprising:

a capacitance potential supply unit, wherein the capacitance potential supply unit supplies the third potential and the fourth potential to the second node, when the signal carriers are discharged from the photoelectric conversion layer, in a case where electric paths between N photoelectric conversion units among the plurality of photoelectric conversion units and the amplification unit are all put into a conductive state, the second node of the capacitance element is supplied with the fourth potential, when the signal carriers are discharged from the photoelectric conversion layer, in a case where electric paths between M photoelectric conversion units that are more than the N photoelectric conversion units among the plurality of photoelectric conversion units and the amplification unit are all put into a conductive state, the capacitance potential supply unit supplies a fifth potential to the second node of the capacitance element, and the fifth potential is a potential having a value higher than the fourth potential.

16. The photoelectric conversion apparatus according to claim 8, further comprising:

a capacitance potential supply unit, wherein the capacitance potential supply unit supplies the third potential and the fourth potential to the second node, when the signal carriers are discharged from the photoelectric conversion layer, in a case where electric paths between N photoelectric conversion units among the plurality of photoelectric conversion units and the amplification unit are all put into a conductive state, the second node of the capacitance element is supplied with the fourth potential, when the signal carriers are discharged from the photoelectric conversion layer, in a case where electric paths between M photoelectric conversion units that are more than the N photoelectric conversion units among the plurality of photoelectric conversion units and the amplification unit are all put into a conductive state, the capacitance potential supply unit supplies a fifth potential to the second node of the capacitance element, and the fifth potential is a potential having a value lower than the fourth potential.

17. The photoelectric conversion apparatus according to claim 1, wherein the photoelectric conversion layer includes a quantum dot.

18. The photoelectric conversion apparatus according to claim 1, wherein switching from either one of the first relationship and the second relationship to the other one of the first relationship and the second relationship is performed by changing the potential of the second electrode.

19. A photoelectric conversion system comprising:
a photoelectric conversion unit;
a signal line;
a reset unit having an input node, and an output node connected to a floating diffusion node;
a driving unit connected to the floating diffusion node;
an amplification unit having an input node, and an output node connected to the signal line; and
an output control unit, wherein the photoelectric conversion unit includes a first electrode, a second electrode, a photoelectric conversion layer that is arranged between the first electrode and the second electrode and accumulates signal carriers, and an insulating layer arranged between the photoelectric conversion layer and the second electrode,
a magnitude relationship between a potential applied to the first electrode and a first potential applied to the second electrode by the driving unit is a first relationship in a first period, in the first period, the input node is supplied with a potential corresponding to the first potential, and the amplification unit outputs a signal corresponding to the potential of the input node, to the signal line, in a second period, the magnitude relationship is in a second relationship that is opposite of the first relationship by changing a potential applied to the second electrode by the driving unit from the first potential to a second potential, in a third period, during which the amplification unit outputs a signal corresponding to a potential of the input node, the potential of the input node corresponds to the signal carriers accumulated by the photoelectric conversion layer during the third period, the magnitude relationship is in the first relationship, the second period is a period between the first period and the third period, and the output control unit sets a potential range of the output node in the second period to be smaller than each of a potential range of the output node in the first period and a potential range of the output node in the third period, or the output control unit puts the amplification unit into a non-operating state in at least a part of the second period; and an output signal processing unit configured to generate an image by processing a signal based on the optical signal output by the photoelectric conversion unit.

20. The photoelectric conversion system according to claim 19, wherein the photoelectric conversion apparatus outputs both a first signal based on the optical signal output from a part of the photoelectric conversion units among the plurality of photoelectric conversion units and a second signal based on the optical signal outputs from all the photoelectric conversion units among the plurality of photoelectric conversion units to the output signal processing unit, a phase difference is detected by using a difference between the first signal and the second signal, and an image is generated by using the second signal.

* * * * *